(12) United States Patent
Honda et al.

(10) Patent No.: US 6,500,294 B1
(45) Date of Patent: Dec. 31, 2002

(54) MANUFACTURING METHOD OF FRICTION PLATE FOR CLUTCH

(75) Inventors: Yukiharu Honda, Okazaki (JP); Hideto Nakagawa, Aichi-ken (JP)

(73) Assignee: Aisin Kako Kabushiki Kaisha, Nishikamo-gun (JP)

( * ) Notice: Subject to any disclaimer, the term of this patent is extended or adjusted under 35 U.S.C. 154(b) by 96 days.

(21) Appl. No.: 09/620,553

(22) Filed: Jul. 20, 2000

(30) Foreign Application Priority Data

Jul. 22, 1999 (JP) .......................................... 11-208256
Jul. 7, 2000 (JP) ....................................... 2000-206605

(51) Int. Cl.⁷ ............................................. B32B 31/04
(52) U.S. Cl. ..................... 156/265; 156/256; 156/264; 156/299; 156/519; 156/539; 156/556; 156/560; 188/18 A; 188/218 XL; 428/66.2
(58) Field of Search .................. 156/74, 230, 241, 156/250, 256, 261, 264, 265, 297, 299, 303, 519, 520, 539, 540, 541, 542, 556, 558, 559, 560, 566; 188/17, 18 A, 218 XL, 73.1, 73.2, 73.31; 29/897, 897.2, 729, 738, 739, 740, 741, 743, 757, 760, 832; 428/66.2

(56) References Cited

U.S. PATENT DOCUMENTS 4,070,229 A * 1/1978 Hentz et al. ................. 156/556
4,375,126 A * 3/1983 Dull et al. ..................... 221/93
4,953,283 A * 9/1990 Kawabata et al. ........... 118/503
5,571,372 A * 11/1996 Miyaishi et al. ............ 156/251

FOREIGN PATENT DOCUMENTS

JP 4-068491 11/1992
JP 10-318309 12/1998

* cited by examiner

*Primary Examiner*—Michael W. Ball
*Assistant Examiner*—Jessica Rossi
(74) *Attorney, Agent, or Firm*—Oblon, Spivak, McClelland, Maier & Neustadt, P.C.

(57) ABSTRACT

This invention relates to a manufacturing method and a manufacturing apparatus of friction plate for clutch.

The present invention intends to provide the manufacturing method and the manufacturing apparatus of friction plate for clutch which can adhere the plural friction material segments to the core plate in shorter time period than that in the conventional art.

The manufacturing method comprises a step for containing plural friction material segments 2 on a one surface 70a of a holding body 4 circumferentially; and a step for making the one surface of said holding body 4 and an adhering surface of a core plate 8 coated with an adhesive agent come near to each other, and for adhering the friction material segments 2 held by said holding body 4 to the adhering surface of said core plate 8 by urging.

6 Claims, 16 Drawing Sheets

MANUFACTURING METHOD OF FRICTION PLATE FOR CLUTCH

BACKGROUND OF THE INVENTION

1. Field of the Invention

This invention relates to a manufacturing method and a manufacturing apparatus of friction plate for clutch.

2. Related Art

A friction plate for clutch is used, in a clutch of a vehicle etc., to brake a rotating member such as rotor. It is comprised of a ring-shaped core plate and a plurality of friction material segments adhered to a surface of the core plate circumferentially. Japanese Patent Publication No. 4-68491 and Japanese Patent Laid-open No. 10-318309 have disclosed examples for manufacturing method and the manufacturing apparatus of friction plate for clutch. The manufacturing methods of the friction plate for clutch disclosed in these prior arts comprise a punching step for punching the friction material tape by a punching unit to form one piece of friction material segment, and a adhering step for adhering the punched friction material segment to an adhering surface of a core plate coated by an adhesive agent.

In detail, a band-shaped friction material is supplied above the core plate radially inwardly or tangentially to be punched into the friction material segment of a predetermined shape by the punching unit including a die and a punch. Then, the punched friction material segment is adhered to the adhering surface of the core plate by the punch just below the punching position. After adhering of the friction material segment to the core plate, the band-shaped friction material is supplied by the predetermined length and the core plate is rotated by the predetermined angle synchronous therewith, to perform forming and adhering of the next friction material segment. With repeating the punching step and the adhering step alternately by the times equivalent to the number of the friction material segments, all of the friction material segments have been adhered to the core plate circumferentially.

The manufacturing apparatus of friction plate for clutch is comprised of a supporting table supporting the core plate and intermittently rotating in every adhering of the friction material segment to the core plate, a supplying member for intermittently supplying the band-shape friction material over the supporting table by a predetermined length corresponding to length of the friction material segment, and a pressing member (punching unit) for punching the band-shaped friction material and for adhering the punched friction material segment to the core plate.

However, the above-mentioned manufacturing method and the manufacturing apparatus of Japanese Patent Publication No. 4-68491 and Japanese Patent Laid-open No. 10-318309, punching the band-shaped friction material and adhering the punched friction material segment to the core plate by the pressing member alternately by times equivalent to the number of the friction material segments, has been suffering from the following disadvantages.

A first disadvantage results from a characteristic change of the adhesive agent coated onto the core plate. Due to repeating punching step and the adhering step performed for each friction material segment, long time period is required from adhering of the first friction material segment to adhering of the last friction material segment. Therefore, characteristic of the adhesive agent having been coated on the core plate prior to punching of the band-shaped friction material changes between a start and an end of the friction material segment adhering to the core plate. Thus, adhering condition delicately differ for each of the friction material segments.

As a result, when all of the friction material segments are adhered to the core plate, particular friction material segment(s) may shift radially and/or circumferentially from a desired position on the adhering surface. Thus, positioning accuracy of the friction material segment may be deteriorated, which changes a relative position between the particular friction material segment and the friction material segment adjacent thereto. Thus, orientation and width of a radial groove formed between opposing sides of the adjacent friction material segments may change.

A second disadvantage results from wear of the punching unit. The die and the punch included in the punching unit forms one friction material segment by one operation thereof. So, for forming the plurality of friction material segments by the band-shaped friction material, the same die and punch are used by the plural times equivalent to the number of friction material segments. In addition, the same blade portion of the die and that of the punch are repeatedly abutted to the band-shaped friction material in every punching to be worn. Thus, the punching unit decreases punching ability thereof in short time period and requires to be changed.

As mentioned above, in the conventional manufacturing method and the manufacturing apparatus of friction plate for clutch, there has been room for improvement in the insufficient positioning accuracy of the friction material segment on the core plate. It results from uneven adhering condition of the plural friction material segments due to longer adhering time period. Also, there has been room for improvement in earlier wear of the blade portion of the punching unit and earlier exchange of the punching unit. It results from the same blade portion of the punching unit abutting to the band-shaped friction material repeatedly by times equivalent to the number of the friction material segments to be worn.

SUMMARY OF THE INVENTION

The present invention has been achieved in view of the above circumstances and intends to provide the manufacturing method and the manufacturing apparatus of friction plate for clutch which can overcome the above disadvantages of the conventional art. That is, the manufacturing method and the manufacturing apparatus of the present invention can adhere the plural friction material segments to the core plate in shorter time period than that in the conventional art. Thus, shifting of the friction material segment (s) in the circumferential and/or radial direction of the core plate due to uneven adhering condition can be prevented.

Also, the present invention intends to, in connection with the above-mentioned adhering manner of the friction material segments to the core plate, provide the manufacturing method and the manufacturing apparatus which can extend the durability life of the punching unit.

Inventors of the present invention pay attention to the fact that above-mentioned disadvantage results from punching the band-shaped friction material and adhering the friction material segments being repeated for each friction material segment, that is, the adhering step being carried out by the times equivalent to the number of the friction material segments. They hit on such disadvantages may be overcome by decreasing the number of time for adhering the friction material segment to the core plate.

A method for manufacturing a friction plate for clutch, comprising steps of a step for containing plural friction material segments on a one surface of a holding body circumferentially; and a step for making the one surface of said holding body and an adhering surface of a core plate coated with an adhesive agent come near to each other, and for adhering the friction material segments held by said holding body to the adhering surface of said core plate by urge.

The manufacturing method of the present invention can adhere in the adhering step the plural friction material segment held on one surface thereof in the containing step to the adhering surface of the core plate simultaneously or in very short time period. Thus, the time period required for adhering the plural friction material segments to the core plate has been greatly reduced compared with that in the conventional manufacturing method, so that all of the friction material segments are adhered to the core plate in the same adhering condition. As a result, the radial or circumferential shifting of the particular friction material segment can be prevented.

Also, the containing step, not including any adhering step between containing of the preceding friction material segment and the succeeding friction material segment, can contain the plural friction material segments into the holding body continuously. As a result, a punching unit of type punching the band-shaped friction material to form the friction material segment continuously at different punching blade parts can be adopted. Such punching unit can decrease the using frequency of the punching blade greatly to extend the durability life thereof.

Further, fiber fabrics formed around the friction material segment in punching the friction material tape by the first urging member extend opposite to pressing-in direction of the friction material segment into the holding body. However, the friction material segment is pushed out from the holding body opposite to the push-in direction in adhering to the core plate. So, the fiber fabrics nipped by the core plate and the friction material segment can not be observed, which improve appearance of the friction plate for clutch.

On the other hand, an apparatus for manufacturing a friction plate for clutch, comprising a holding body having a one surface for containing plural friction material segments circumferentially; a first urging member for urging the friction material segments to contain them in said holding body; a supporting member for supporting a core plate having an adhering surface coated by an adhesive agent; and a second urging member for urging the friction material segments held in said holding body to said core plate, at position where the one surface and the adhering surface come near to each other.

The manufacturing apparatus of the present invention can adhere the plural friction material segments held on one surface of the holding body simultaneously or in very short time period by urging with the second urging member.

In addition, the second urging member does not adhere any friction material segment between containing of the preceding friction material segment and the succeeding friction material segment by the first urging member. For this reason, the holding body and the first urging member can contain the friction material segments on one surface continuously by cooperation therebetweeen. As a result, a segment preparing member (punching unit) of type punching band-shaped the friction material to form the friction material segment continuously at different punching blade parts can be adopted. Such segment preparing member can decrease the using frequency of the punching blade greatly to extend the durability life thereof.

(Embodying Mode of the Manufacturing Method of Friction Plate for Clutch)

As mentioned above, the manufacturing method is comprised of the containing step and the adhering step.

The friction material segments are prepared in advance in a segment preparing step for punching or cutting a band-shaped friction material to form the friction material segment. The segment preparing step can punch the plural friction material segment continuously or intermittently. Also, the segment preparing step can be carried out for the band-shaped friction material obtained by compressing a band-shaped friction blank material with heating it. The band-shaped friction blank material can have plural cavities spaced longitudinally thereof or a groove extending longitudinally thereof. The segment preparing step is carried out prior to the containing step to be explained next, but they can be carried out continuously in one step or can be independently carried out in different or separate steps. The segment preparing step and the adhering step to be explained later can be carried out in different step concurrently.

Next, the containing step will be explained. The containing step can contain the friction material segment(s) into the holding body in a vertical direction toward one surface, ie, in a vertical direction relative to a surface of the friction material segment. This is convenient when one surface is formed on end surface of the circular-plate-shaped holding body. The containing step can contain the friction material segment(s) into the holding body along (parallel to) one surface radially inwardly, that is, in parallel direction relative to the surface of the friction material segment. This is convenient when one surface is formed by a step or a recess formed along an outer peripheral edge the circular-plate-shaped holding body.

The friction material segments can be contained by urging. For the urging, mechanical means such as an urging member etc. or hydraulic means such as air cylinder or an oil cylinder can be used. For the mechanical means, rod-shaped urging member advancing and retracting vertical to one surface can be adopted, which can ensure containing of the friction material segment into the holding body. For the hydraulic means, the holding member can have, at area where the segment containing portion is formed, an absorbing portion for absorbing the friction material segment under the reduced pressure. Absorbing the friction material segment can make the above rod-shape urging member unnecessary.

The containing step can contain, after having contained at least one friction material segments, the friction material segment(s) sequentially in the circumferential direction of the holding body. In other words, the two or more friction material segments can be contained into the holding body one by one. In this case, the containing step can include a positioning sub step for positioning each of the contained friction material segments at each of supplying portions by rotating the holding body, after each of the friction material segments is contained into each of the supplying portions. Rotating the holding body in the containing step of the friction material segments allows to supply the friction material segments at one or few supplying position(s). Also, it positions the contained friction material segment(s) at the supplying position spaced circumferentially on one surface of the holding body.

In addition, the containing step can contain at least two friction material segments simultaneously. In this case, two or more friction material segments are supplied into the non-rotatable holding body at two or more positions on one surface spaced circumferentially. Such containing manner can shorten time period for containing the friction material segments into the holding body.

A plurality of segment supplying portions (holding portions) are preferably formed on one surface of the holding body circumferentially. The segment holding portions can be comprised plural holding portions spaced circumferentially, or can be comprised of one ring-shaped holding portion. Also, the segment holding portion can be comprised of plural spaced concaved portions or one concaved groove formed on the end surface of the circular-plate-shaped holding body (here, bottom surfaces of the concaved portions or a bottom surface of the concaved groove forms the one surface). Further, it can be comprised of plural circumferentially spaced recesses or steps or one ring-shaped recess or step formed on an outer peripheral edge (corner) of the circular-plate-shaped holding body (here, a bottom surface(s) of the recess(es) or step(s) forms (form) the one surface). Plural friction material segments are preferably held on the one surface so that opposing sides of the adjacent friction material segments become parallel in the radial direction of the holding body.

Next, the adhering step will be explained. There is no restriction of positional relation between a containing position to contain the friction material segments into the holding body and an adhering position to adhere the friction material segments to the core plate. Accordingly, they can be positioned on the same axis, or on the different (parallel, for example) axes. However, in view of members or element required for containing and adhering the friction material segment, they are preferably disposed on different axes. In this case, the holding body and/or the core plate need to be moved so that the one surface and the adhering surface come near to each other. For this purpose, only the holding body or only the core plate can be moved, or both of the holding body and the core plate can be moved. When the holding body moves to and from the fixed core plate, it can revolve about a revolving axis, or can move in a direction parallel or vertical to the one surface thereof.

The adhering direction of the friction material segment to the core plate and the containing direction of the friction material segment into the holding body can be selected in opposite directions on the same axis or parallel axes, or in crossing (vertical, for example) directions. The friction material segments held in the holding body can be adhered to the core plate by an urging member held in the holding body shiftably relative thereto. The urging member can be driven by a driving portion such as an air cylinder or an oil cylinder. Such urging member can adhere (push out) the friction material segments to the core plate more securely. Also, the friction material segments held in the holding body can be adhered to the core plate by the urge using an absorbing. Further, the adhering step can adhere all of the contained friction material segments simultaneously, which can greatly shorten the time period necessary for adhering the plural friction material segments to the core plate.

The embodying modes described in each of the containing step, the adhering step and the segment preparing step capable of selectively combining should be noted.
(Embodying Mode of the Manufacturing Apparatus of Friction Plate for Clutch)

As mentioned above, the manufacturing apparatus is comprised of the holding body, the first urging member, the supporting member, and the second urging member.

The friction material segment can be prepared by punching or cutting a band-shaped friction material. The band-shaped friction material formed by compressing a band-shaped friction blank material to a predetermined thickness can be used. The band-shaped friction material can have plural cavities spaced longitudinally, or one groove extending longitudinally.

The segment preparing member can be provided independent from the first urging member to be explained next, or a part thereof can be formed by the first urging member. In the former case, the segment preparing member can be comprised of a rotatable cutting roller having plural cutting blades on an outer peripheral surface thereof. It can form plural friction material segments simultaneously. The latter case will be explained in the column of the first urging member.

The holding member can have various shape, but is preferably circular plate or circular pillar, in view of plural friction material segments being held on the core surface thereof circumferentially. The one surface of the holding body can be formed on an end surface of the circular holding body, or on an outer peripheral edge (corner) thereof. In the former case, a bottom surface(s) of a concaved portion(s) can form the one surface, while in the latter case a surface(s) defining the recess(s) or step(s) can form the one surface. The holding body is preferably provided with plural segment supplying portions (holding portions) on the one surface thereof. The segment holding portions can be comprised plural concaved portion spaced circumferentially, or one concaved groove extending circumferentially on the end surface of the holding body. Also, they can be comprised of plural circumferentially spaced recesses or steps, or one ring-shaped recess or step. The one surface can have, at areas into which the friction material segments are contained, an absorbing portion to absorb the friction material segments under the reduced pressure.

The holding body can be rotatable or non-rotatable depending on a containing manner (the number of containing positions) of the friction material segments into the holding body. When the friction material segments are contained at one position or few positions, the holding body is preferably rotatable to contain then circumferentially. In this case, the holding body rotates, after having contained the friction material segment into respective supplying position, to position it at the supplying position. Thus, the preceding friction material segment(s) having been contained is positioned at the predetermined position circumferentially. To the contrary, when the plural friction material segments are contained whole around the holding body, the holding body needs not be rotated.

The first urging member containing the friction material segment(s) on one surface thereof can urge the friction material segment(s) toward the one surface vertical thereto, that is. vertical to a surface of the friction material segment. It also can urge the friction material segment(s) radially inwardly along the one surface, that is, in parallel to the surface of the friction material segment. The urging manner of the friction material segment(s) is associated with the location, orientation, number of the one surface and the segment holding portion.

The first urging member can contain one friction material segment, or two or more friction material segments with one operation thereof simultaneously. Configuration of the first urging member can be determined depending on the number of the friction material segments to be contained simultaneously. For example, containing one friction material segment by one operation one rod-shaped urging member each corresponding to each friction material segment can be used. on the hand, for containing all of the friction material segments required (eight to sixty) at once a ring-shaped or circular-shaped urging member can be used.

In containing the friction material segments at one or few position(s) into the holding body by one or few rod-shaped first urging member(s), the first urging member(s) and the holding body cooperate with each other so that, after containing of at least one friction material segment, the succeeding friction material segment is contained sequentially in the circumferential direction. For such cooperation, the holding body can rotate by the predetermined angle in every containing of the friction material segment (intermittently).

When the first urging member forms a part of the segment preparing member, a rest of it is formed by the holding body. For example, the segment preparing member can be constructed by an entry portion of the concaved portion as the segment holding portion, and a tip end portion of the rod-shaped urging member to be inserted into the above concaved portion. In this case, the first urging member and the holding body need to have punching blade to punch the band-shaped friction material to form the friction material segment. The first urging member and the holding body sufficiently have one punching blade respectively in punching band-shaped friction material at one portion, but they should have two punching blades respectively in punching it at two portions. Constructing the part of the segment preparing member by the first urging member reduces the number of parts necessary for preparing and containing the friction material segments.

For making the holding body having contained the friction material segments and the core plate supported on the supporting member come near, holding body and/or the core plate need to be moved so that the one surface and the adhering surface come near to each other. For this purpose, only the holding body or only the core plate can be moved, or both of the holding body and the core plate can be moved. When the holding body moves relative to the fixed core plate, it can revolve about a revolving axis, or can move in a direction parallel or vertical to the one surface thereof.

The supporting member supporting the core plate preferably has at least a mounting surface for the core plate and an attaching/detaching mechanism for the core plate. Preferably, it is rotatable to coat an adhesive agent on an adhering surface of the core plate.

The second urging member for adhering the friction material segments held in the holding body to the core plate by urge is preferably shifted relative to the holding body. It can shift in the opposite direction to the first urging member on the same axis or different (parallel) axes, or it can shift in the vertical direction to the first urging member. The second urging member capable of abutting at a part thereof to the friction material segment, retracts when the friction material segment is contained in the holding body but advances when it is adhered to the core plate. For urging the second urging member, mechanical means such as a rod-shaped urging member or a hydraulic means such as an air cylinder or an oil cylinder can be used. The mechanical means usually pushes out the friction material segments, but the hydraulic means can push out or draw-out them.

In addition, the second urging member can adhere the friction material segments one by one, but preferably adhere all of the contained friction material segments simultaneously to shorten the time period necessary for adhering the friction material segments to the core plate.

The embodying modes described in the each of the holding body, the first urging member, the supporting member, the second supporting member and the segment preparing member capable of combining selectively should be noted.

PREFERRED EMBODIMENT OF THE INVENTION

Figure 1:
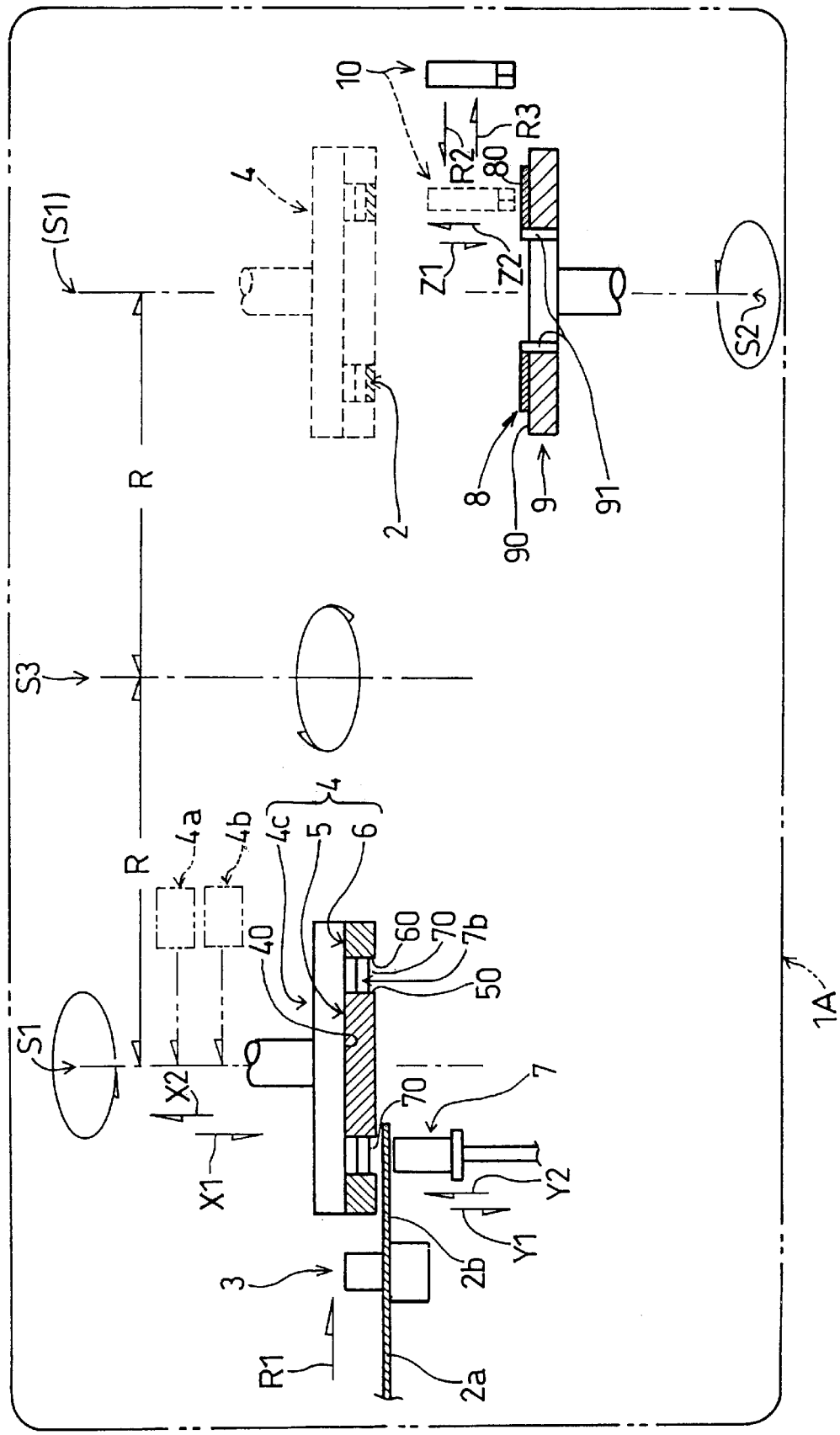
FIG. 1 is a front cross-sectional view of an embodiment 1 corresponding to a manufacturing method of friction plate for clutch of the first invention and a manufacturing apparatus of friction plate for clutch of the second invention.

Hereinafter, embodiments and deformed samples of the present invention will be explained with reference to attached drawings.

<Embodiment 1>

An embodiment 1 corresponding to a manufacturing method for a friction plate for clutch of a first invention, and a manufacturing apparatus 1A of a friction plate for clutch of a second invention for carrying out the manufacturing method, will be explained based on FIGS. 1 to 5.

This embodiment 1 manufactures, by a manufacturing apparatus 1A of a friction plate for clutch. That is, a friction material tape 2a is trimmed by a trimming device 3 and punched into a plurality of friction material segments 2 by the holding body 4 and a segment punch 7 and contained in the holding body 4 by the segment 7. The friction material segments 2 are adhered or pasted to a core plate 9 by a pushing-out member 7b.

(Manufacturing Apparatus for Friction Material Plate for Clutch)

The manufacturing apparatus 1A includes a supplying member (not shown) for supplying the friction material tape 2a to a punching area and the trimming device 3 for trimming edges thereof, a holding body 4 to punch the trimmed friction material tape 2b in a thickness direction thereof cooperating with a segment punch 7 and to hold a plurality of friction material segments 2 in a containing groove 70 circumferentially, the pushing-out member 7b for pushing out the friction material segments 2 held in the containing groove 70, a rotatable turn table 9 on which a core plate 8 is mounted, and a coating member 10 for coating an adhesive agent on the core plate 8.

In detail, the trimming device 3, trimming the edges of the friction material tape 2a prior to punching thereof, includes movable upper and a lower trimming molds 3a and 3b and is located radially outwardly (leftwardly in FIG. 1) and below the holding body 4. The trimming device 3 trims the edges 20 of the friction material segments 2 so that the facing sides 20a (refer to FIG. 2) of the adjacent friction material segments 2 become parallel, when the friction material segments 2 are contained in the containing groove 70.

A trimming angle of the trimming molds 3a and 3b is adjusted corresponding to a size (width) or the number of the friction material segments 2 used for desired the friction material plate for clutch. The adjustable trimming angle enables the trimming device 3 to trim the edges 20 of the friction material tape 2a without changing the trimming molds 3a and 3b, even when size of the friction material segments 2 is changed.

The holding body 4 includes an upper circular die holder 4c, a circular-plate-shaped inner periphery punching die 5 (briefly referred "inner die" hereinafter) and a ring-shaped outer periphery punching die 6 (briefly referred "outer die" hereinafter) attached to a lower surface of the die holder 4c coaxially. A lower surface of the inner die 5 and a lower surface of the outer die 6 form a lower (end) surface 4d of the holding body 4. The rod-shaped segment punch 7 can enter into a ring-shaped containing recess 70 formed between the inner die 5 and the outer die 6 on the end surface 4d, and can retract therefrom. A bottom surface 70a parallel to the end surface 4d forms segment supplying (holding) portions. The ring-shaped pushing-out member 7b disposed within the containing groove 70 can go out therefrom axially to push out the friction material segments 2 toward the core plate 8 mounted on the turn table 9.

The holding body 4 rotatably and shiftably held is controlled a rotation thereof about an axis S1 by every predetermined angle by an index controlling portion 4a, and is controlled a shift thereof along the axis S1 (refer to arrows X1 and X2) by a convey controlling portion 4b. A revolution of the holding body 4 about an axis S3 parallel to the axis S1 is controlled by a controlling portion (not shown) so that the holding body 4 has a punching position facing with the segment punch 7 and an upper position above a adhering position facing with the coating member 10.

The rod-shaped segment punch 7 disposed below the holding body 4 is lifted toward the ring-shaped containing groove 70 and is lowered therefrom by a driving portion (not shown) as shown by arrows Y1 and Y2. The segment punch 7 is fixed circumferentially of the holding body 4. Entering into the containing groove 70, the segment punch 7 punches the trimmed friction material tape 2b at first and second portions longitudinally spaced by a predetermined distance, with an outer periphery 7a, cooperating with the outer periphery 50 of the inner die 5 and an inner periphery 60 of the outer die 60. The first portion near to a tip end of the friction material tape 2b is punched by the outer periphery 7a and the outer periphery 50, while the second portion thereof retracted therefrom is punched by the outer periphery 7a and the inner periphery 60. The segment punch 7 pushes the punched friction material segment 2 into the containing groove 70 to hold it on the bottom surface 70a. Thus, the segment punch 7 has a functions to punch the friction material tape 2b and to push the friction material segment 2 into the containing groove 70.

The pushing-out member 7b held within the containing groove 70 advances and retracts in directions parallel to the axis S1 by an oil cylinder or an air cylinder (not shown).

Being lowered at the adhering position after revolution, the pushing-out member 7b pushes out all of the friction material segments 2 held in the containing groove 70 simultaneously.

The ring-shaped turn table 9 is rotated about the axis S2 parallel to the axes S1 and S3 by a driving portion (not shown). The turn table 9 has a ring-shaped mounting surface 90 on an upper surface thereof, and a chucking pawl 91 for chucking the core plate 8 is disposed in a circular hole of the turn table 9.

The coating member 10 disposed above the turn table 9 is reciprocatively movable radially inwardly and outwardly of the core plate 9 as shown by arrows R2 and R3, and in a direction approaching to and separating from the mounting surface 90 of the core plate 9 as shown by arrows Z1 and Z2.

The friction material tape 2a to be trimmed by the trimming device 3 can be produced by forming a wet-type friction material basic paper into a tape, and then is impregnated a phenol resin as the matrix resin and dried. The basic paper is prepared by mixing a pulp, aramid fiber and a friction adjusting agent by a predetermined ratio. Also, the friction material tape 2a can be produced by forming the basic paper into the tape after impregnation of the phenol resin and the drying operation.

Next, the trimming steps for trimming the edges of the friction material tape 2a, for punching the friction material tape 2 at the punching position and pushing-in the friction material segment 2 in the holding body 4, and for pushing-out the friction material segments 2 from the holding body 4 to the core plate 8 at the adhering position will be explained.

(Trimming Step of Friction Material Tape)

Figure 2:
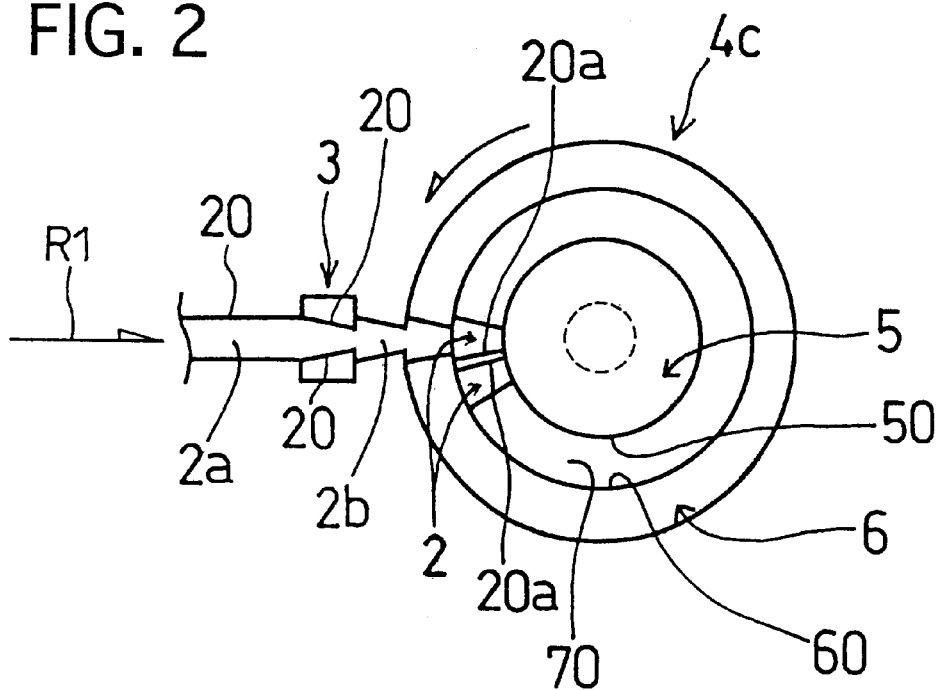
FIG. 2 is a bottom view showing, in the embodiment 1, condition for punching a supplied friction material tape into a friction material segment and containing it into a holding body.
Figure 3:
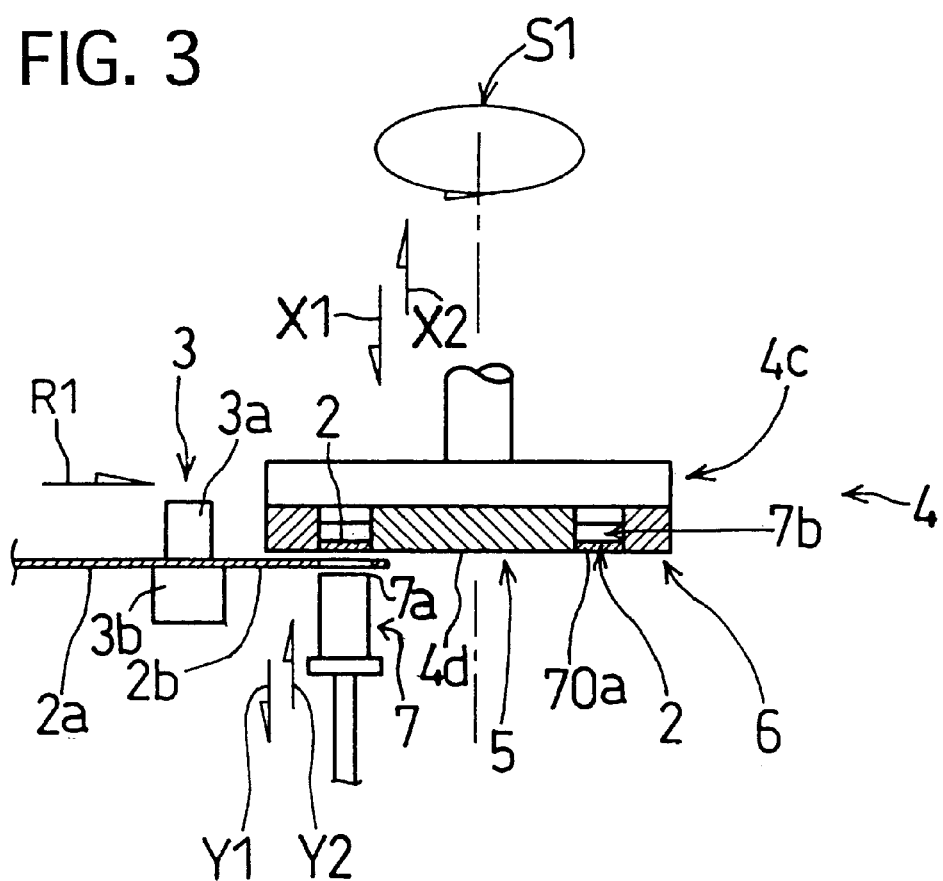
FIG. 3 is a front cross-sectional view showing, in the embodiment 1, condition for punching a supplied friction material tape into a friction material segment and containing it into a holding body.

The friction material tape 2a is supplied radially inwardly of the holding body 4 toward the trimming device 3 as shown by arrow R1 with a supplying member (not shown) by a predetermined pitch. The friction material tape 2a thus supplied is trimmed the edges 20 thereof by a pair of trimming molds 3a and 3b to form a trimmed friction material tape 2b. As shown in FIG. 2, the both edges 20 of each segment portion are inclined relative to a longitudinal direction to gradually width and to have isosceles trapezoid-shape.

(Punching of Friction Material Tape and Pushing-in of Friction Material Segment)

The trimmed friction material tape 2b is conveyed radially inwardly of the holding member 4 below the inner die 5 and the outer die 6, and is set at position where a tip end portion faces with the containing groove 70 formed between the outer periphery 50 and the inner periphery 60.

Next, the segment punch 7b ascends toward the containing groove 70 as shown by arrow Y2. The friction material tape 2a is punched at the first portion thereof slightly retracted from the tip end by the outer periphery 50 and the outer periphery 7a, and is punched at the second portion retracted from the first portion by a distance by the inner periphery 60 and the outer periphery 7a, to form the friction material segment 2. The punched friction material segment 2 is pushed into the containing groove 70 by the segment punch 7, and is held on the bottom surface 70a by engagement of a front end and a rear end thereof with the inner periphery 60 and the outer periphery 50, respectively. Therefore, even after descending of the segment punch 7, the friction material segment 2 will not drop from the containing groove 70. Here, some kinds of pressure reducing mechanism (not shown) for absorbing the plural friction material segments 2 in the containing groove 70 can be provided to hold the friction material segments 2 more securely.

After having punched the preceding friction material segment 2, the inner die 5 and the outer die 6 are indexed by a predetermined angle with the index controlling portion 4a. Synchronous therewith, the friction material tape 2a is supplied by a predetermined length (slightly larger than length of the friction material segment 2) by the supplying device and the trimming device 3. Then, the trimming of the friction material tape 2b by the trimming device 3, punching of the friction material tape 2b by the inner and outer dice 5, 6 and segment punch 7 to form the succeeding friction material segment 2a, and pushing-in of the friction material segment 2 into the containing groove 70 by the segment punch 7 are performed in the same way as mentioned above. Thus, as shown in FIG. 2, the preceding friction material segment 2 and the succeeding friction material segment 2 are contained in the containing groove 70 side by side circumferentially so that opposing edges 20a (extending in a radial direction of the holding member 4) are parallel to each other.

With repeating the above steps or processes by plural times corresponding to the numbers of friction material segments 2 (eight to sixty), the plural friction material segments 2 are formed sequentially and are held on the bottom surface 70a of the containing groove 70 circumferentially so that all of opposing edges 20a of the adjacent plural friction material segments 2 are parallel.

(Pushing-out of Friction Material Segment from Holding Body and Adhering of Friction Material Segment to Core Plate)

Figure 4:
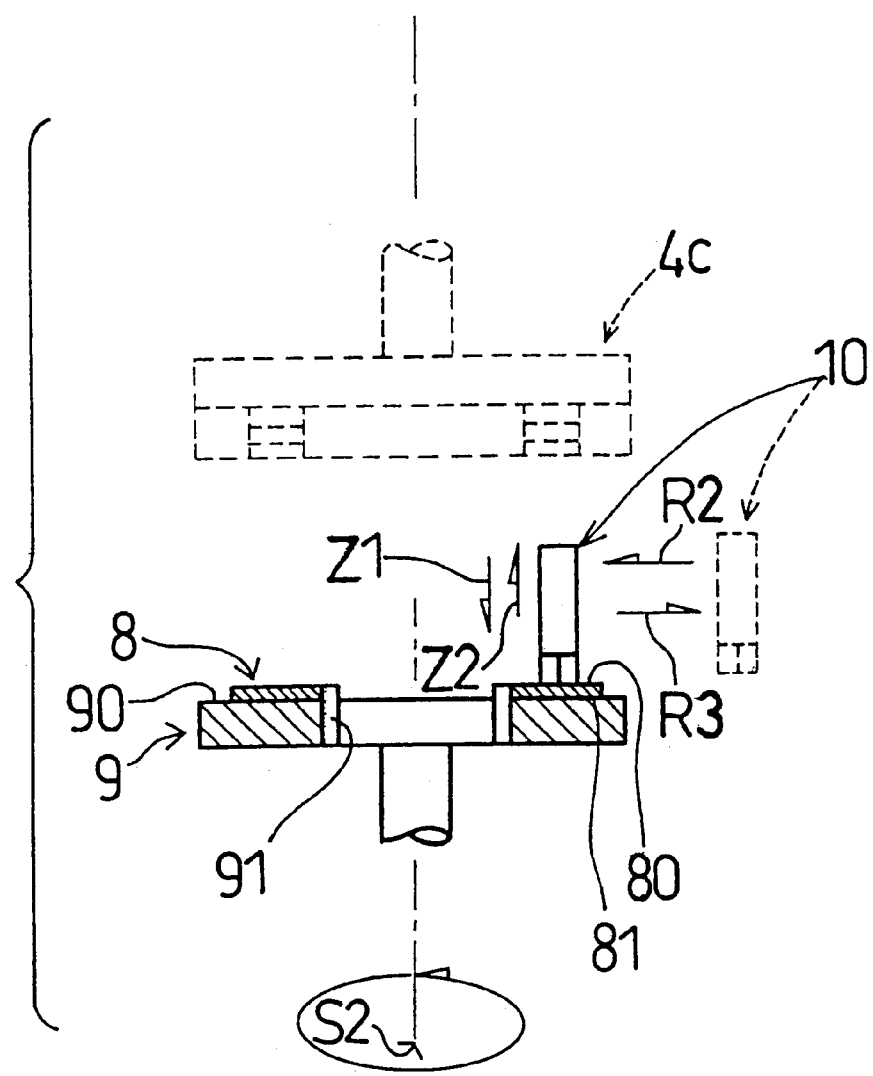
FIG. 4 is a front cross-sectional view showing condition for coating an adhesive agent on a core plate by a coating member.

In FIGS. 1 and 4, the holding body 4 having held the plural friction material segments 2 in the containing groove 70 is revolved about the axis S3 by a controlling portion (not shown) in radius of R by 180 degrees to the upper position shown by dotted line above the adhering position shown by solid line facing the turn table 9. For revolving, the holding body 4 can be mounted on a rotating table for example. As shown in FIG. 4, at the adhering position the axis S1 of the holding body 4 coincides with an axis S2 of the turn table 9.

Then, the core plate 8 is coated an adhesive agent by the coating member 10. The coating member 10 is moved radially inwardly of the core plate 8 as shown by arrow R2 in FIG. 4, and then is lowered to approach to the core plate 8 as shown by arrow Z3. With rotating the turn table 9 about the axis S2, the coating member 10 coats the adhesive agent on one annular adhering surface 80.

The number of rotations and rotating angle of the turn table 9 are controlled corresponding to the area of the adhering surface 80 to be coated and the coating manner. That is, when the coating agent is coated on the adhering surface 80 by one round or plural rounds the turn table 9 is rotated by one rotation or plural rotations. In both of the one round coating and the plural round coating, the coating member 10 can discharge the adhesive agent in ring-shaped adhering area (continuous coating), or can discharge it intermittently to coat the adhering surface intermittently (intermittent coating).

The coating the core plate 8 by the coating member 10 is preferably performed when the holding body 4 is positioned at the upper position to prevent characteristic change of the discharged adhesive agent due to drying. However, the core plate 8 may be coated during pushing-in of the friction material segments 2 into the containing groove 70 to shorten the time necessary for coating the adhesive agent.

After completion of the coating to the core plate 8, the coating member 10 is separated away from the core plate 8 as shown by arrow Y2 and is moved radially outwardly as shown by arrow R3.

When the holding body 4 is lowered to the adhering position by the convey controlling portion 4b after the adhesive agent coating, the ring-shaped pushing-out member 7b disposed in the containing groove 70 is advanced by the oil cylinder as shown by arrow U. Thus, all of the plural friction material segments 2 held on the whole peripheral area of the bottom surface 70a are pushed out toward the core plate 8 simultaneously. They are pressed onto and adhered to the adhering surface 80 of the core plate 8 via the adhesive agent coated in advance by the coating member 10. In this way, the eight to sixty friction material segments 2 are adhered to the adhering surface 80 circumferentially in one round in a predetermined circumferential interval. The opposing sides 20a of the adjacent friction material segments 2 are parallel to form grooves extending radially therebetween.

Thenafter, the pushing-out member 7b retracts into the containing groove 70. The holding member 4 is lifted to separate away from the core plate 8 by the convey controlling portion 4b, and is revolved by 180 degrees the controlling portion to return to the punching position shown in FIG. 1.

Here, when the friction material segments 2 are adhered to the other adhering surface 81 of the core plate 8, the core plate 8 is reversed the front/rear surface thereof by loosing the chuck pawl 91, after completion of the coating to one adhering surface 80. The coating to the other adhering surface 81 is performed likewisely. Then the friction material segment 2 are pushed out by the segment punch 7 from the holding body 4 having once returned to the punching position to contain next set of the friction material segments 2.

The core plate 8 having been coated the adhesive agent on only the adhering surface 80 or on the both adhering surfaces 80 and 81 is removed from the turn table 9 by loosing the chuck pawl 91, and then is subjected to the second adhering process. In the second process, hardening of the adhesive agent and thickness of the friction material segment 2 are adjusted under the predetermined temperature, time period and pressure respectively set. Thus, the friction material plate for clutch has been manufactured.

The manufacturing method and the manufacturing apparatus of the embodiment 1 render the following advantages.

Firstly, in the punching of the friction material tape 2b and pushing-in of the friction material segments 2, the outer periphery 50 of the inner die 5 and the inner periphery 60 of the outer die 6 cooperating with the outer periphery 7a of the segment punch 7 rotate intermittently by the predetermined angle in every punching. Thus, the outer periphery 50 and the inner periphery 60 punch the friction material tape 2b at different punching blade parts. Accordingly, during one rotation of the inner die 5 and the outer die 6, the particular punching blade part of the inner periphery 50 and the outer periphery 60 punch the friction material tape 2b only once. As s result, durability life and the allowable times of the punching unit including the inner die 5, outer die 6 and the segment 7 has extended. In this way, the equipping cost of the manufacturing apparatus, that is, the manufacturing cost for the friction material plate for clutch has been reduced.

Secondary, the holding body 4 having held the plural friction material segments 2 in the containing groove 70 circumferentially at the punching position moves to the upper position above to the core plate 8 by revolution and then descends to the adhering position. The contained plural friction material segments 2 are pushed out simultaneously by the pushing-out member 7b. As a result, all of the friction material segments 2 are adhered to the core plate 8 in the same adhering condition, that is, the adhering condition of each segment 2 not different. So, they will not shift radially or circumferentially on the adhering surface 80 (81). Thus, the friction material plate for clutch in which all of the plural friction material segments 2 have been adhered to the same or common circular area of the core plate 8 positionally accurate has been obtained.

Further, fiber fabrics formed around the friction material segment 2 in punching the friction material tape 2b by the segment punch 7 etc. extend opposite to pressing-in direction of the friction material segment 2 into the containing groove 70. However, the friction material segment 2 is pushed out from the containing groove 70 opposite to the push-in direction in adhering to the core plate 8. So, the fiber fabrics nipped by the core plate 8 and the friction material segment 2 can not be observed, which improve appearance of the friction plate for clutch.

In addition, with pushing in the friction material segment 2 to the holding body 4 only at one position, construction for containing the plural friction material segments 2 into the holding body 4 can be made simple. Due to revolution of the holding member 4 between the punching position and the upper position, shifting construction of the holding body 4 can be made simple.

<Deformed Sample 1>

A deformed sample 1 of the punching of friction material tape and the containing of friction material segment will be explained. This deformed sample 1 uses, instead of the segment punch 7 in the embodiment 1, a ring-shaped and rotatable segment punch 7A shown in FIG. 6. This ring-shaped segment punch 7A rotatable about the axis S1 has a ring-shaped punching blade 7a at an inner periphery and an outer periphery thereof which enters the ring-shaped containing groove 70 formed between the outer portion 50 of the inner die 5 and the inner periphery 60 of the outer die 6. The segment punch 7A is lifted and lowered shown by arrows Y1 and Y2 and is rotated intermittently by a drive portion (not shown).

The segment punch 7A, cooperating with the inner die 5 and the outer die 6, punches the friction material tape 2b supplied in a one radial direction at the first portion slightly retracted from the tip end and the second portion further retracted therefrom. The friction material segment 2 thus formed is pushed into the containing groove 70 by the segment punch 7A. Then, the segment punch 7A rotates, together with the inner die 5 and the outer die 6, by the predetermined angle for forming the next friction material segment 2.

In this deformed sample 1, the inner die 5, the outer die 6 and the segment punch 7A punch the friction material tape 2b repeatedly at different punching blade parts spaced circumferentially thereof to form each of plural friction material segments 2. In other words, during one rotation of the inner die 5, the outer die 6 and the segment punch 7A, predetermined part of the punching blade punch the friction material tape 2b only once, which has the extended durability life compared with that of the conventional punching unit.

<Deformed sample 2>

A deformed sample 2 of the punching of friction material tape and the containing of friction material segment will be explained.

This deformed sample 2 supplies, a non-trimmed friction material tape 2b of constant width to the holding body 4 including the die holder 4c, the inner die 5 and the outer die 6 in a tangential direction. The friction material tape 2b is trimmed at two portions spaced longitudinally thereof by a trimming device (not shown). Then, the friction material tape 2b is punched by the inner and outer dice 5 and 6 and the segment punch 7 (refer to FIGS. 1 to 5) into the shape similar to the friction material segment 2, and is pushed into the containing groove 70.

This deformed sample 2 gives flexibility of the supplying direction of the friction material tape 2a.

<Deformed sample 3>

A deformed sample 3 of the punching of friction material tape and the containing of friction material segment will be explained.

Figure 8:
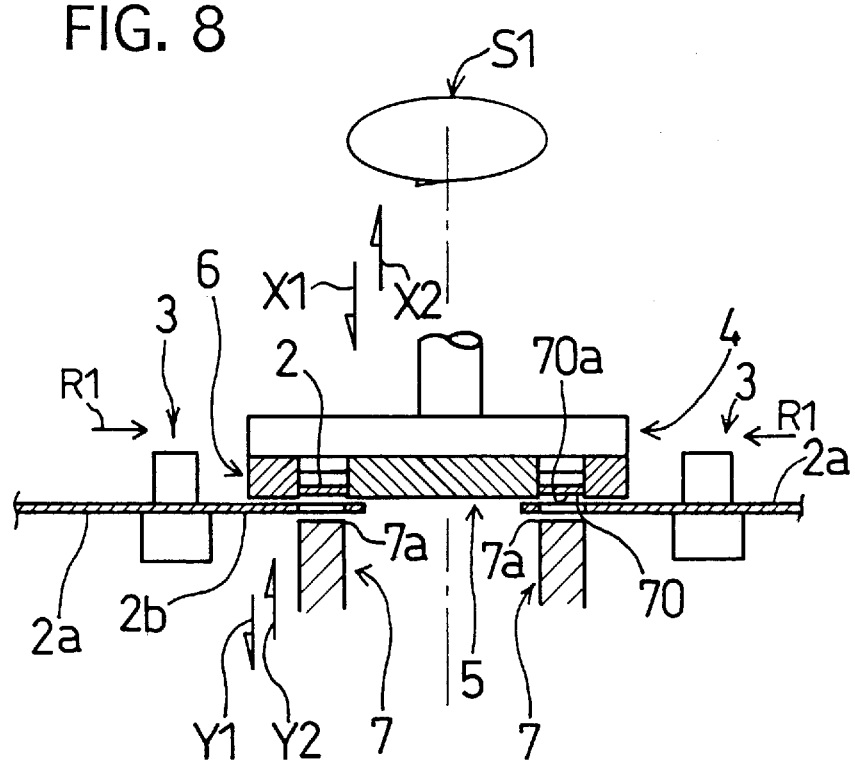
FIG. 8 is a front cross-sectional view showing a deformed sample 3 of the containing step in the embodiment 1 in which two friction material tapes supplied at two positions are punched into friction material segments and contained in a holding body.

This deformed sample 3, different from the above embodiment 1 in which the friction material tape 2b is supplied in one position (left position of the holding body 4), supplies two friction material tapes 2b in two positions (left position and right position of the holding body 4) as shown in FIG. 8. Corresponding to it, two supplying devices (not shown), two trimming devices 3, and two rod-shaped segment punches 7 are provided. Each of two friction material tapes 2b is punched by the inner die 5, the outer die 6 and the segment punches 7 into the friction material segment 2 which is pushed into the containing groove 70 by the segment punch 7 to be held on the bottom surface 70a.

According to the deformed sample 3, the time periods necessary for punching the friction material tape 2b into the predetermined numbers of the friction material segments 2 and pushing them into the containing groove 70 have been reduced by half, compared with that of the embodiment 1. Further, the using frequency of the punching unit including the inner die 5 the outer die 6 and the segment punches 7 has been reduced by half to extend the durability life thereof.

<Deformed sample 4>

A deformed sample 4 of the punching of friction material tape and the containing of friction material segment will be explained.

Figure 6:
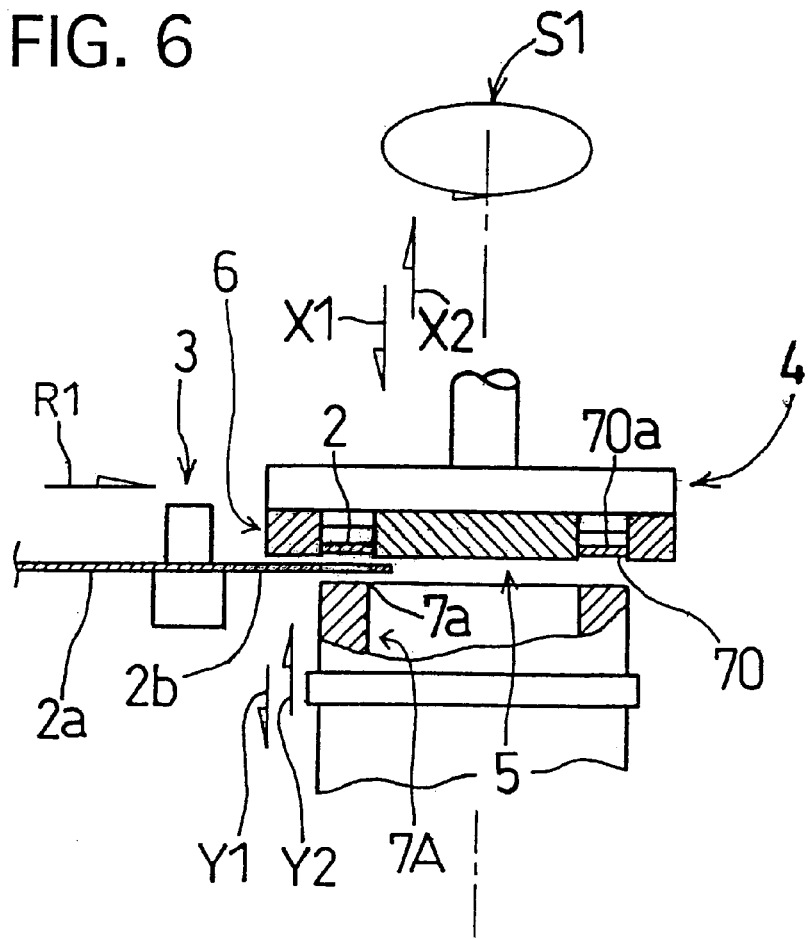
FIG. 6 is a front cross-sectional view showing a deformed sample 1 of the containing step in the embodiment 1, in which a friction material tape is punched into a friction material segment by a ring-shaped segment punch and contained into a holding body.
Figure 7:
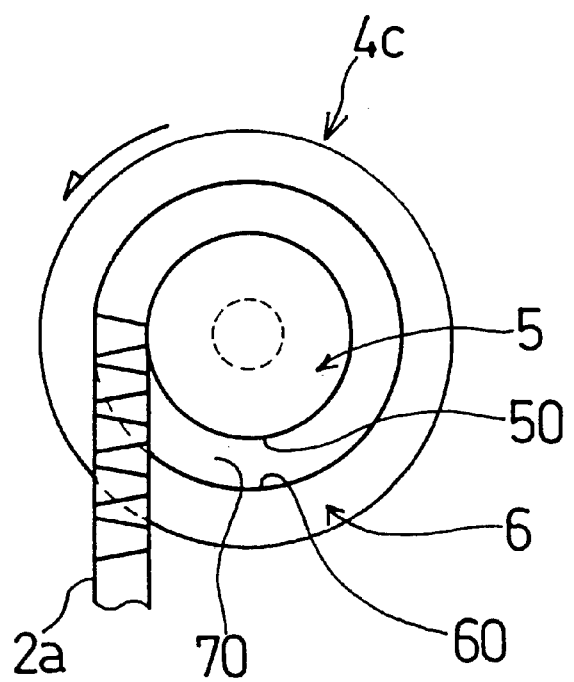
FIG. 7. is a bottom view showing a deformed sample 2 of the containing step in the embodiment 1, in which a friction material tape supplied tangentially is punched into a friction material segment.
Figure 9:
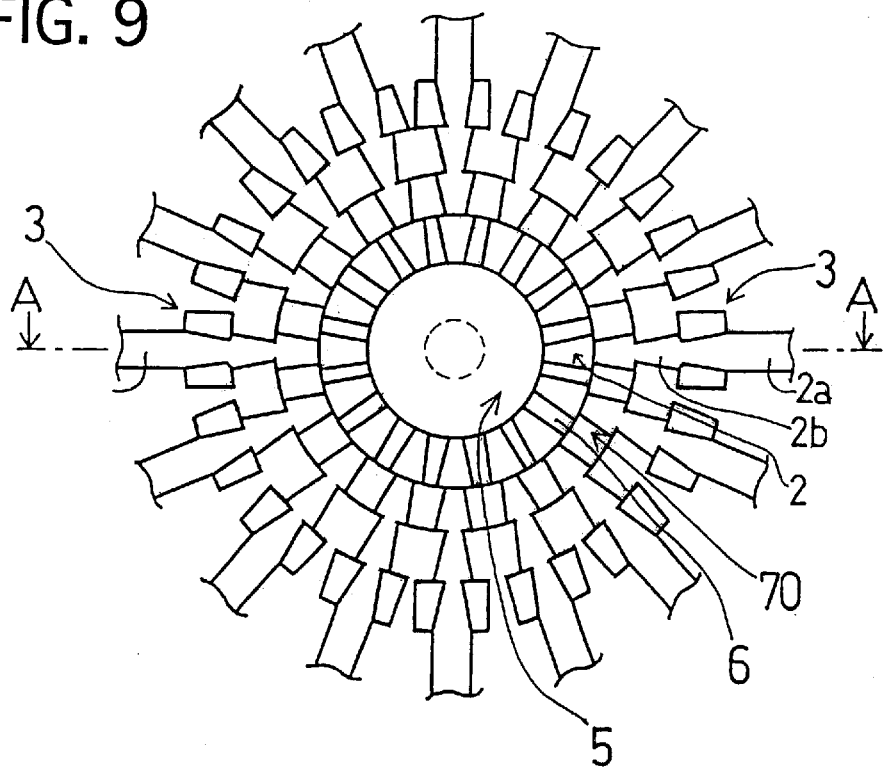
FIG. 9 is a bottom view showing a deformed sample 4 of the containing step in the embodiment 1 in which plural friction material tapes are arranged radially around a holding body and punched by a ring-shaped segment punch, and the friction material segments are contained into the holding body.
Figure 10:
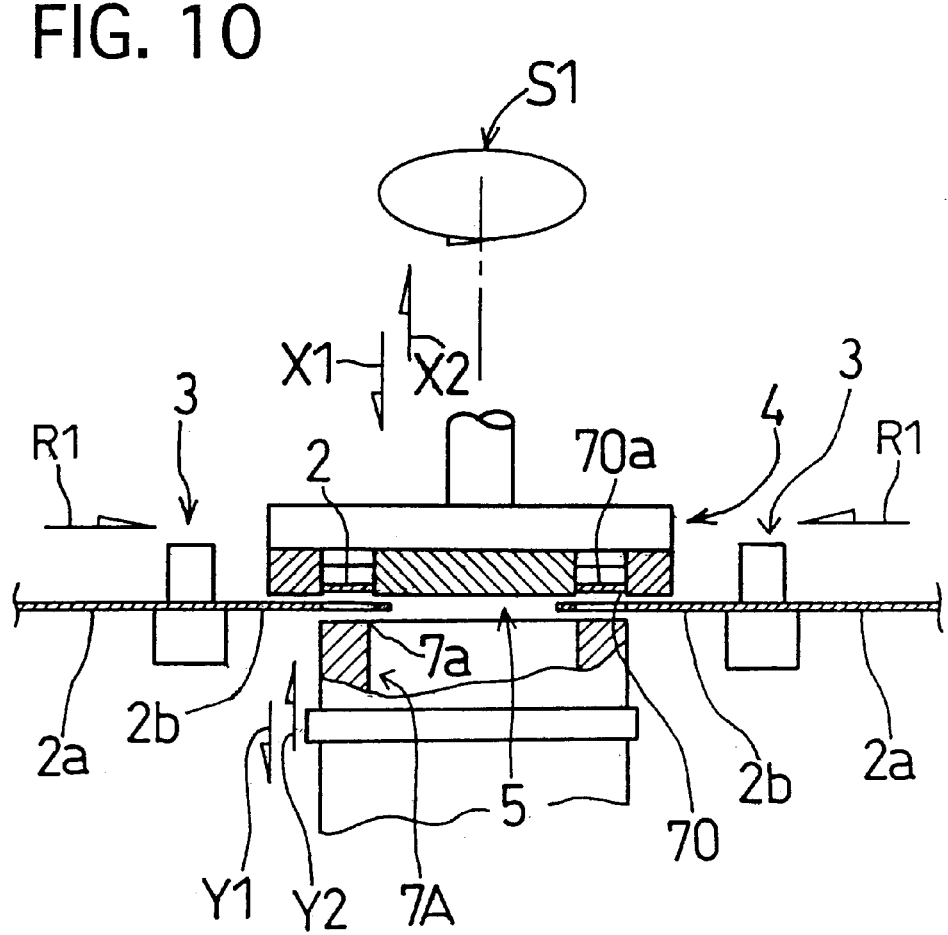
FIG. 10 is a cross-sectional view along a line A—A in FIG. 9.

This deformed sample 4, as shown in FIGS. 9 and 10, fixes all of the inner die 5, the outer die 6 and the ring-shaped segment punch 7 used in the above deformed sample 1 shown in FIG. 6 circumferentially to set a non-rotatable condition. Further, plural number of the supplying devices (not shown) and trimming devices 3 respectively equal to the number of friction material segments 2 adhered to one core plate 8 are disposed around the holding body 4 radially and equidistantly in a circumferential direction. Thus, the plural friction material tapes 2b are supplied radially inwardly simultaneously.

In this deformed sample 4, all of the plural friction material tapes 2b supplied radially inwardly in plural directions are punched simultaneously by one shot of the inner die 5, the outer die 6 and the ring-shaped segment punch 7A at the first portion slightly retracted from the tip end thereof and the second portion further retracted therefrom. Also, all of the punched friction material segments 2 are pushed into the containing groove 70 simultaneously by one shot of the ring-shaped segment punch 7A.

According to the deformed sample 4, both of the time period necessary for punching the friction material tape 2b into the plural friction material segments 2 and for containing the punched plural friction material segments 2 into the containing groove 70 have been greatly reduced. In addition, the predetermined punching blade part of the inner die 5, the outer die 6 and the ring-shaped segment punch 7A has been used only once during one rotation thereof, which extends the durability life of the inner die 6 and so on.

Here, instead of supplying the plural friction material tapes 2b whole around (360 degree) the holding body 4, the friction material tapes 2b can be supplied only in a predetermined divided area (180 degrees, 120 degrees or 90 degrees) obtained by dividing the surrounding area into two, three or four parts. In these cases, the ring-shaped punching unit including the inner die 5, the outer die 6 and the segment punch 7A is indexed corresponding to the divided angle area. For example, when the trimming devices 3 etc. are disposed in the predetermined angle area of 180 degrees, the punching unit is rotated by 180 degree between the preceding punching and the succeeding punching. With such indexing, the punching unit punches the friction material tapes at different punching blade parts before and after the indexing, which reduces the using frequency of the same punching blade parts. Thus, the punching blade parts of the inner die 5, the outer die 6 and the segment punch 7A have extended the durability life.

<Deformed sample 5>

A deformed sample 5 of the punching of friction material tape and the containing of friction material segment will be explained.

Figure 11:
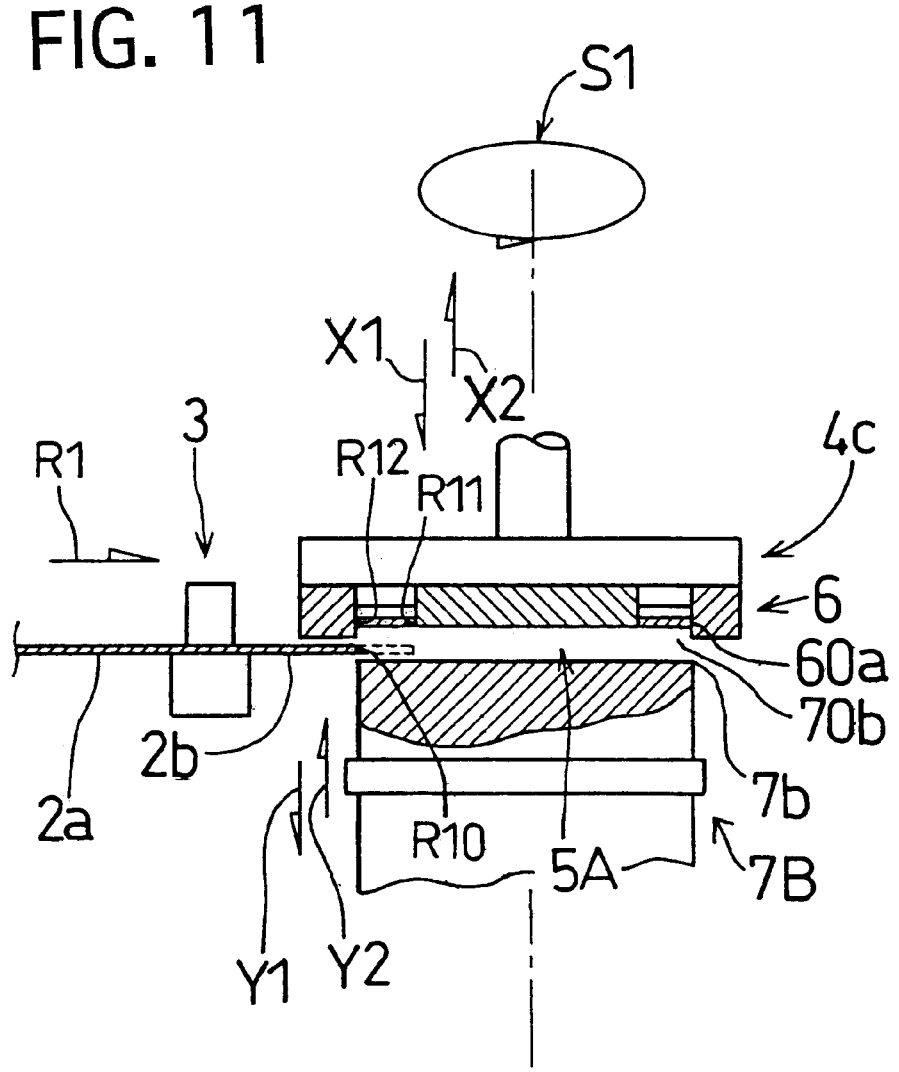
FIG. 11 is a front cross-sectional view showing a deformed sample 5 of the containing step in the embodiment 1 in which a friction material tape is punched into a friction material segment by a circular segment punch and contained into a holding body.

This deformed sample 5 uses, instead of the inner die 5 and the ring-shaped segment punch 7A used in the above deformed sample 1 shown in FIG. 6, a circular plate-shaped segment punch 7B shown in FIG. 11. This segment punch 7B has at an outer periphery thereof a ring-shaped outer punching blade 70b cooperating with a ring-shaped inner punching blade 60a of the outer die 6. A circular-plate-shaped holding portion 5A disposed in a hollow portion of the outer die 6 and not having any punching blade is thinner than the outer die 6 to form a cavity to allow entry of the segment punch 7A. A ring-shaped containing groove 70 in formed between the outer periphery of the holding portion 5A and the inner periphery of the outer die 6.

The outer punching blade 70b punches (shears) the friction material tape 2b at one portion retracted from the tip end thereof by cooperating with the inner punching blade 60a, when the segment punch 7A enters the cavity of the outer die 6.

In the deformed sample 5, the friction material tape 2a advances by a distance corresponding to the length of the friction material segment 2, and is punched by the inner punching edge 60a and the outer punching blade 70b at one portion retracted from the tip end. Thus, the friction material segment 2 having an arch-shaped inner periphery R11 and an arch-shaped outer periphery R12 are formed. The segment punch 7B and the outer die 6, after having formed the friction material segment 2, are rotated by the predetermined angle (indexed). In this way, the inner die 6 and the segment punch 7B punch the friction material tape 2b repeatedly by the punching blade parts spaced circumferentially, so that the using frequency of the same punching blade part reduces. For this reason, the durability life of the outer die 6 and the segment punch 7B has extended compared with that of the conventional punching unit.

Also, in the deformed sample 5, the friction material tape 2b being supplied by the distance substantially corresponding to the length of the friction material segment 2, is punched only at one portion. Therefore, when the friction material tape 2b is punched an arch-shaped tip end R10 of the friction material tape 2b from which the arch-shaped outer periphery R12 of the punched friction material segment 2 is divided, forms the arch-shaped inner periphery R11 of the succeeding friction material segment 2 (refer to FIG. 11). In other words, the arch-shaped tip end R10 of the friction material tape 2a forms the arch-shaped inner periphery R11 of the friction material segment 2. For this reason, almost no part or area of the friction material tape 2b has been wastefully used in the punching thereof, which enables to increase the yielding rate of the friction material tape 2b and to reduce amount of the punched scrap generated upon punching.

Here, the plural friction material segments 2 held in the containing groove 70 abut to the outer periphery 50a of the holding portion 5A and to the inner periphery 60 of the outer die 6, respectively at the inner periphery and the outer periphery thereof. Thus, the friction material segments 2 are prevented from dropping from the containing groove 70.

Also, in this deformed sample 5, two friction material tapes 2b can be supplied radially inwardly in two directions located in the diameter direction of the holding body 4, similar to the above deformed embodiment 3 shown in FIG. 8.

<Deformed sample 6>

A deformed sample 6 of the punching of friction material tape and the containing of friction material segment will be explained.

Figure 12:
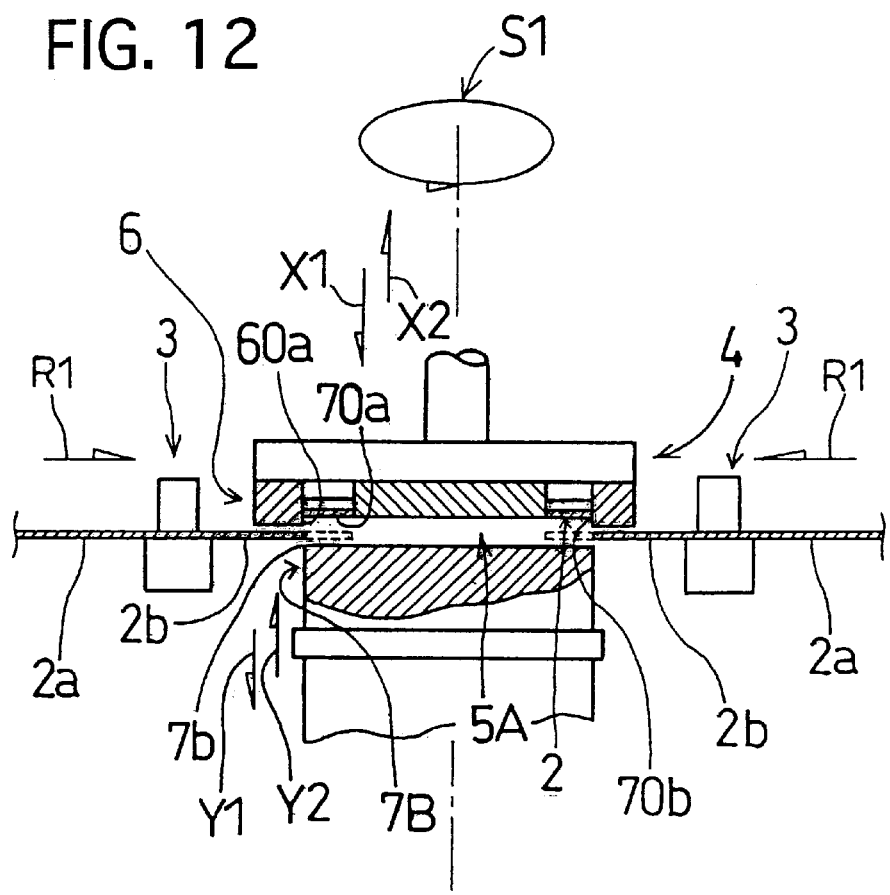
FIG. 12 is a bottom view showing a deformed sample 6 of the containing step in the embodiment 1 in which plural friction material tapes are arranged radially around a holding body and punched by a circular segment punch simultaneously, and the friction material segment are contained into the holding body.

In this deformed sample 6, as shown in FIG. 12, the outer die 6 and the segment punch 7B of the above deformed sample 5 shown in FIG. 11 are fixed circumferentially (non-rotatable), and the plural friction material tapes 2b are supplied around the holding body 4.

In detail, as shown in FIG. 12, plural number (equivalent to the number of friction material segments 2 adhered to one core plate 8 of supplying devices (not shown) and trimming devices 3 are disposed whole around the holding body 4 radially and equidistantly in the circumferential direction. A circular-plate-shape segment punch 7B having an outer punching blade 70b cooperating with an inner punching blade 60a of the ring-shaped outer die 6 is non-rotatable but is lifted and lowered by a driving portion (not shown). When the segment punch 7B enters into the cavity of the outer die 6, the outer punching edge 70b and the inner punching blade 60 punch each of all friction material tapes 2b simultaneously at one portion retracted from the tip end into the plural friction material segments 2. They are pushed into the containing groove 70 by the segment punch 7B.

In this deformed sample 6, the outer die 6 and the segment punch 7B punch each of the friction material tapes 2 at one portion to form the friction material segment 2 having the arch-shape inner periphery R11 and the arch-shape outer periphery R12. Accordingly, as mentioned in the above deformed sample 5, almost no tape material has been wastefully used. Also, the plural friction material segments 2, having been formed simultaneously by punching the plural friction material tapes 2b by the outer die 6 and the segment punch 7B, are pushed into the containing groove 70 by the segment punch 7B simultaneously. As a result, as mentioned in the deformed sample 4 shown in FIGS. 9 and 10, the time periods necessary for forming the plural friction material segments 2 and for containing them in the containing groove 70 have been greatly shortened. Further, the inner die 6 and the segment punch 7B, punching each of plural friction material tapes 2b at different punching blade parts spaced circumferentially, have the extended durability life.

Here, the same deformation mentioned in the above deformed sample 4 can be made in this deformed sample 6.

<Deformed sample 7>

A deformed sample 7 of the punching of friction material tape and the containing of friction material segment will be explained.

Figure 13:
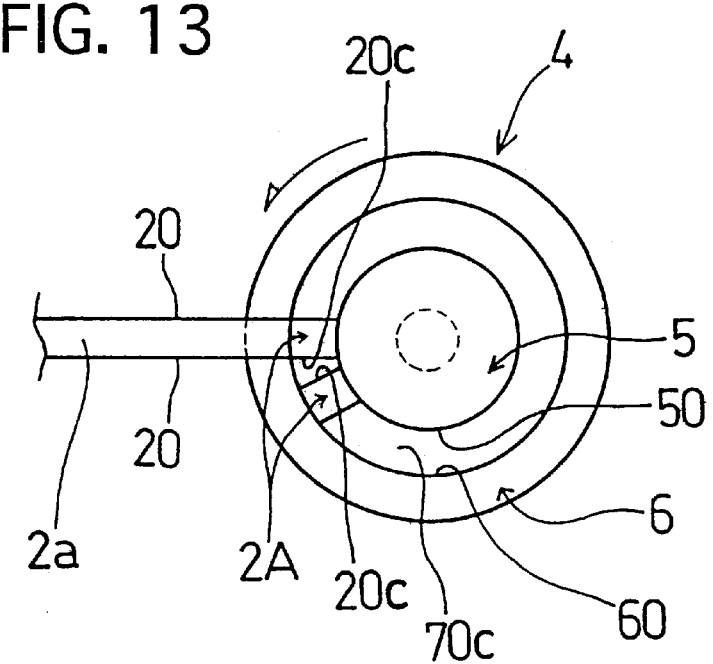
FIG. 13 is a bottom view showing a deformed sample 7 of the containing step in the embodiment 1 in which a friction material tape is punched into a friction material segment without being trimmed and contained into a holding body.

The deformed sample 7, as shown in FIG. 13, punches a friction material tape 2a into the friction material segment 2 without trimming edges 20 thereof, different from the above embodiment 1 and so on.

Here, the two portions of the friction material tape 2b spaced longitudinally can be trimmed as occasion demands.

When the spaced two portions are not trimmed as shown in FIG. 13, the friction material tape 2a supplied to the holding body 4 radially inwardly is punched by the inner die 5, the outer die 6 and the segment punch 7 (refer to FIG. 1) into a friction material segment 2 A. The punched friction material segment 2A is pushed into the containing groove 70 by the segment punch 7. As shown in FIG. 13, the facing sides 20c are not parallel to each other.

To the contrary, when the spaced two portions of the friction material tape 2a are trimmed by cutting or shearing, the tape 2a is pushed into the friction material segment 2A by the inner die 5 and so on. Here, irrespective of trimming of the longitudinally spaced two portions, the friction material tape 2a is supplied by the predetermined length and the holding body 4 is rotated by he predetermined angle synchronous therewith, in every formation of the friction material segment 2A.

According to the deformed sample 7, no trimming of the edges 20 of the friction material tape 2a increases the yielding rate of the tape material. In particular, when the longitudinally spaced two portion are not trimmed, the yielding rate reaches near to 100% theoretically.

It is noted that this deformed sample 7 can be applied to the above deformed samples 1 to 6 similarly.

<Deformed Sample 8>

A deformed sample 8 of the trimming of friction material tape and the containing of friction material segment will be explained.

This deformed sample 8 uses, instead of the trimming device 3 and the segment punch 7 in the embodiment 1 and so on, a rotatable cutting roller 40 having a plurality of cutting blades 40a on an outer peripheral surface spaced circumferentially, and a mating roller 41 opposed to the cutting roller 40 via the friction material tape 2a.

In detail, the cutting roller 40 rotatable about a fixed shaft and having a circumferantial length corresponding to total length of plural number of friction material segments 2 adhered to one surface of the core plate 8 is formed plural number of cutting blades 40a thereon. These cutting blades 40a, when the cutting roller 40 is rotating, not only trims the edges 20 of the friction material tape 2b but punches the friction material tape 2b into the friction material segment 2.

Figure 14:
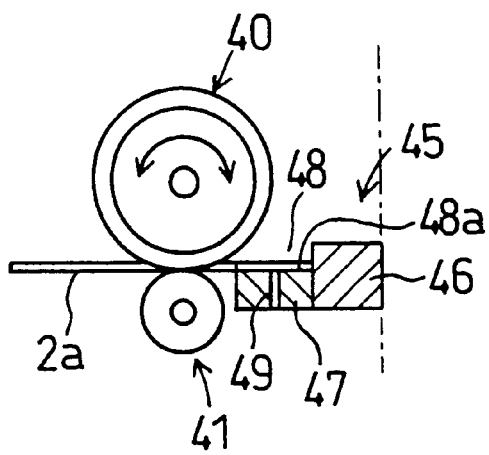
FIG. 14 is a front cross-sectional view showing a deformed sample 8 of the containing step in the embodiment 1 in which a cutting roller and a mating roller are used.
Figure 15:
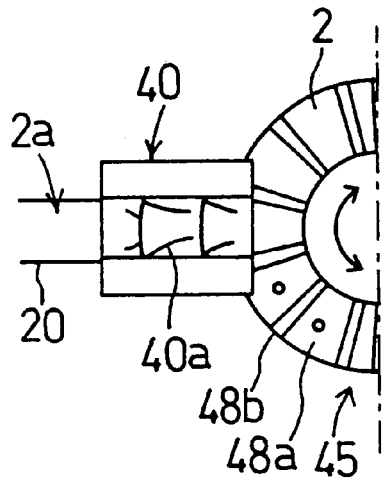
FIG. 15 is a plan view of the deformed sample 8.

The circular plate-shape holding body 45 is comprised of a circular-pillar-shaped member 46 and a ring-shaped member 47 having larger height than that of the member 46. As a result, an annular containing recess or step 48 is formed by an outer periphery surface of the member 46 and an upper surface of the member 47. The upper surface 48a forms a holding surface for holding the friction material segment. A ring-shaped holding surface 48a is provided with a plurality of grooves 48b extending radially and spaced equidistantly in a circumferential direction as shown in FIG. 15, and is provided with a plurality of absorbing holds 49 connected to an absorbing device (not shown) as shown in FIG. 14. The holding body 45 is positioned relative to the cutting roller 40 so that the containing step 48 is located below and lateral of the cutting roller 40. The holding body 45 rotates synchronous with the cutting roller 40.

Being conveyed by the cutting roller 40 and the mating roller 41 radially inwardly of the holding body 45, the friction material tape 2b is trimmed at the both edges 20 thereof and punched into the few friction material segments 2. The punched friction material segments 2 are conveyed into the containing step 48 and held on the holding surface 48a by the absorbing force applied through the absorbing holes 49. With the synchronous rotation of the cutting roller 40 and the holding body 4, the friction material segments 2 continuously formed by punching the friction material tape 2b with the cutting roller 40 are sequentially contained in each holding portion defined by the groove 48b.

According to this deformed sample 8, unnecessity of the segment punch 7 and so on not only makes construction of the manufacturing apparatus simple, but shorten the time periods required for punching the friction material tape 2b and containing the punched friction material segment 2. The holding body 4 not punching the friction material tape 2b does not need any punching blade, which makes construction thereof simple. Further, the plural radial grooves 48b formed on the holding surface 48a prevent shifting of the friction material segments 2 in the circumferential direction.

Additionally, the cutting roller 40 trimming the friction material tape 2b and punching it into the friction material segments 2 makes provision of both of the trimming device 3 and the cutting unit 5 to 7 unnecessary. Further, using frequency of the cutting blades 40a for forming the predetermined number of the friction material segments 2 decreases compared with that of the trimming device 3. These merits are brought by the cutting roller 40 forming plural friction material segments 2 by one rotation thereof. In this way, the cutting roller 40 has the extended durability life.

Here, the two friction material tapes 2b can be supplied at two positions spaced circumferentially (for example two positions faced in the diameter direction (refer to the deformed sample 3 shown in FIG. 8). In this case, two sets of the above cutting rollers 45 and the mating rollers 41 are provided. Such arrangement shortens the time period necessary for forming the predetermined number of friction material segments 2, and extends the durability life of the cutting roller 40 twice that of the prior art.

<Deformed Sample 9>

A deformed sample 9 of the trimming of friction material tape and the containing of friction material segment will be explained.

Figure 16:
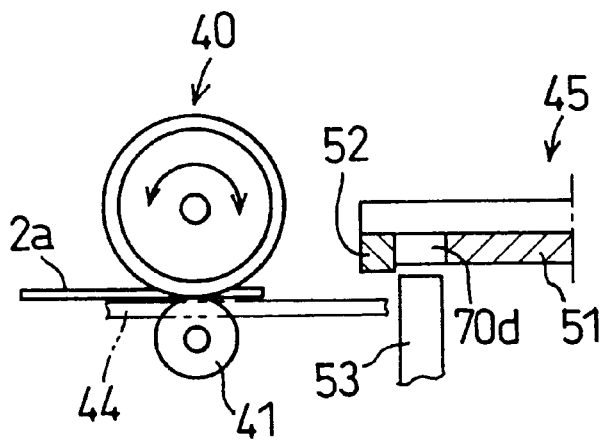
FIG. 16 is a front cross-sectional view showing a deformed sample 9 of the containing step in the embodiment 1 in which a cutting roller and a mating roller are used.

This deformed sample 9 uses, as shown in FIG. 16, instead of the trimming device 3 etc. having the paired trimming molds 3a and 3b in the embodiment 1, the cutting roller 40 and the mating roller 41 same as that in the deformed sample 8. Also, instead of the inner die 5, the outer die 6 and the segment punch 71, a circular plate-shaped holding member 51, an outer ring-shaped holding member 52, and a pushing-in member 53 for pushing in the friction material segment 2 into a ring-shaped containing groove 70d formed between the both holding members 51 and 52 are used. All of the holding member 51, the holding member 52 and the pushing-in member 53 not having any punching blade should be noted. A conveying belt 44 extends between the cutting roller 40 and the holding body 45.

The plural friction material segments 2a continuously formed with punching the friction material tape 2a by the cutting roller 40 are, after having been conveyed below the holding body 45 by the conveying belt 44, pushed into the containing groove 70d by the pushing-in member 53 to be held on a bottom surface thereof.

According to the deformed sample 9, the cutting roller 40 simultaneously forms the plural friction material segments 2 by one rotation thereof, so that the using frequency of the punching blade 40a is reduced compared with the using frequency of the above trimming device 3. As a result, the durability life of the cutting roller 40 has extended. Also, since the friction material tape 2a is punched by the cutting roller 40, the circular-plate-shaped holding member 51, the outer ring-shaped holding member 52 and the pushing-in member 53 not being provided with the punching function have the simple construction.

<Embodiment 2>

Figure 17:
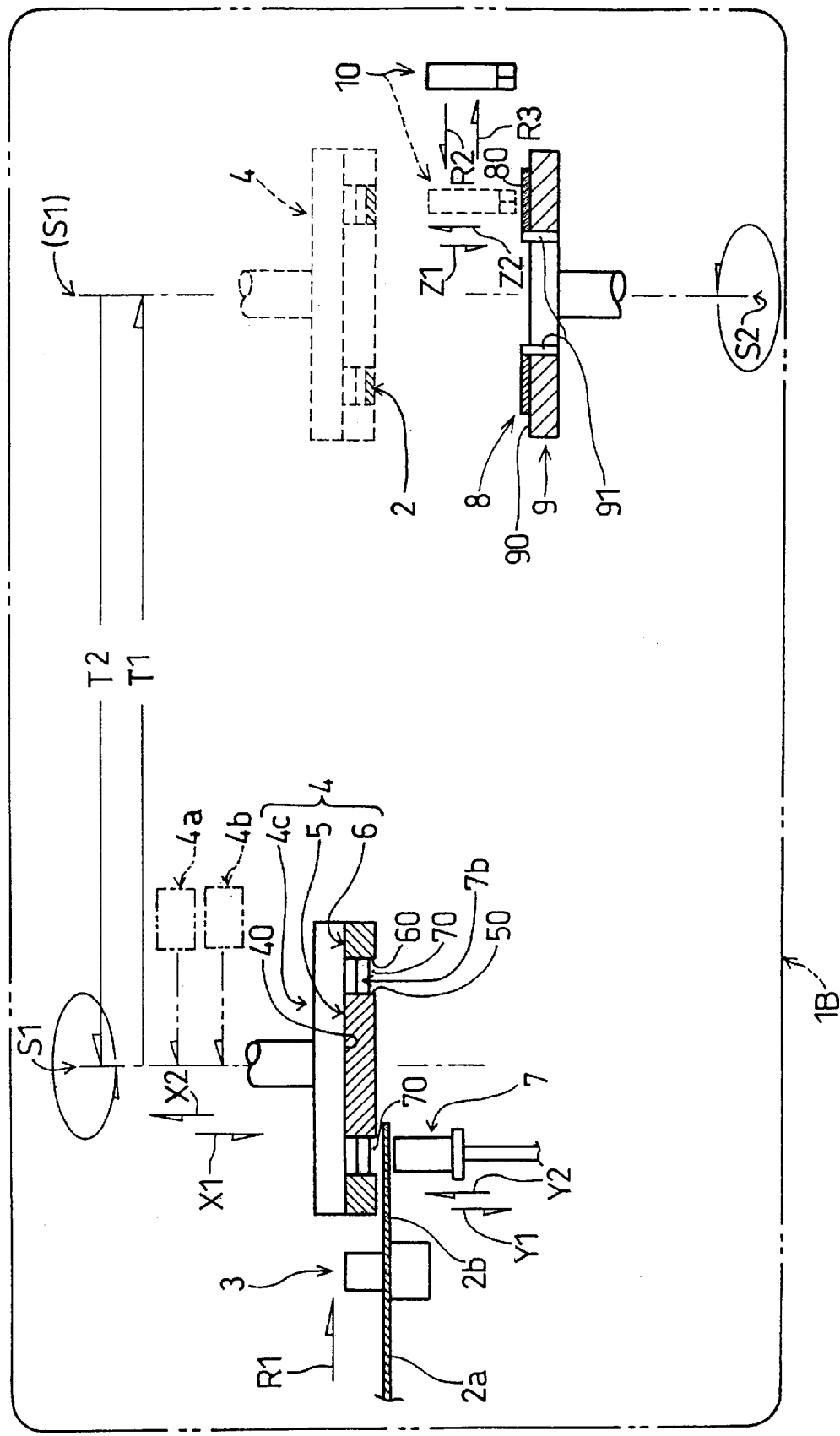
FIG. 17 is a front cross-sectional view of an embodiment 2 corresponding to a manufacturing method of friction plate for clutch and a manufacturing apparatus of friction plate for clutch.

An embodiment 2 corresponding to a manufacturing method for a friction plate for clutch, and a manufacturing apparatus 1B of a friction plate for clutch for carrying out the manufacturing method will be explained based on FIG. 17. This embodiment 2 differs from the above embodiment 1 in the former half of the friction material segment adhering step (the process to make the holding body 4 come near to the core plate 8) and the corresponding construction.

In detail, the holding body 4 reciprocatively moves between the punching position and the adhering position by linear movements in the horizontal and vertical directions. Corresponding to it, in the manufacturing apparatus 1B, the holding body 4 having contained the friction material segments 2 in the containing groove 70 and located at the punching position is driven by a driving portion (not shown) in the T1 direction (rightward in FIG. 17)to move to the upper position. Then, it is lowered to the adhering position by the convey controlling portion 4a to push out the friction material segments 2 contained in the containing groove 70. After having adhered the friction material segments 2 to the core plate 8, the holding body 4 is lifted up by the convey controlling portion 4a and then is driven by the controlling portion in the T2 direction to move to the punching position. A linear guiding rail (not shown) can be used for guiding the linear movement of the holding body 4, for example.

In this embodiment 2, the trimming step, friction material segment containing step and the latter half of the adhering step are same as that in the above embodiment 1. Corresponding to it, the trimming device 3, construction of the holding body 4 other than the driving portion for linear movement, the turn table 9 and the coating member 10 are same as that in the above embodiment 1. Here, the trimming step, containing step and the latter half process of the adhering step and the corresponding construction in one of the above the above deformed samples 1 to 9 can be replaced for that of the embodiment 2.

The manufacturing method and the manufacturing apparatus of the embodiment 2 and the deformed samples 1 to 9 render the following advantages, in addition to the advantages of the embodiment 1 and the deformed samples. That is, the time period necessary for the holding body 4 to move between the punching position and the adhering position is shortened, and no additional space for revolving the holding body 4 is required.

<Embodiment 3>

An embodiment 3 corresponding to a manufacturing method for a friction plate for clutch, and a manufacturing apparatus 1C of a friction plate for clutch for carrying out the manufacturing method, will be explained based on FIGS. 18 to 21.

The manufacturing method of the embodiment 3 sequentially performs a thickness regulating step of a friction blank material tape 2a1, a trimming step of a friction material tape 2a2, a containing step of a friction material segment 2B, and an adhering step of the friction material segment 2B. In other words, the thickness regulating step of the friction blank material tape 2a1 is performed before the trimming step to use a thickness regulated friction material tape 2a2, different from the embodiment 1.

Figure 18:
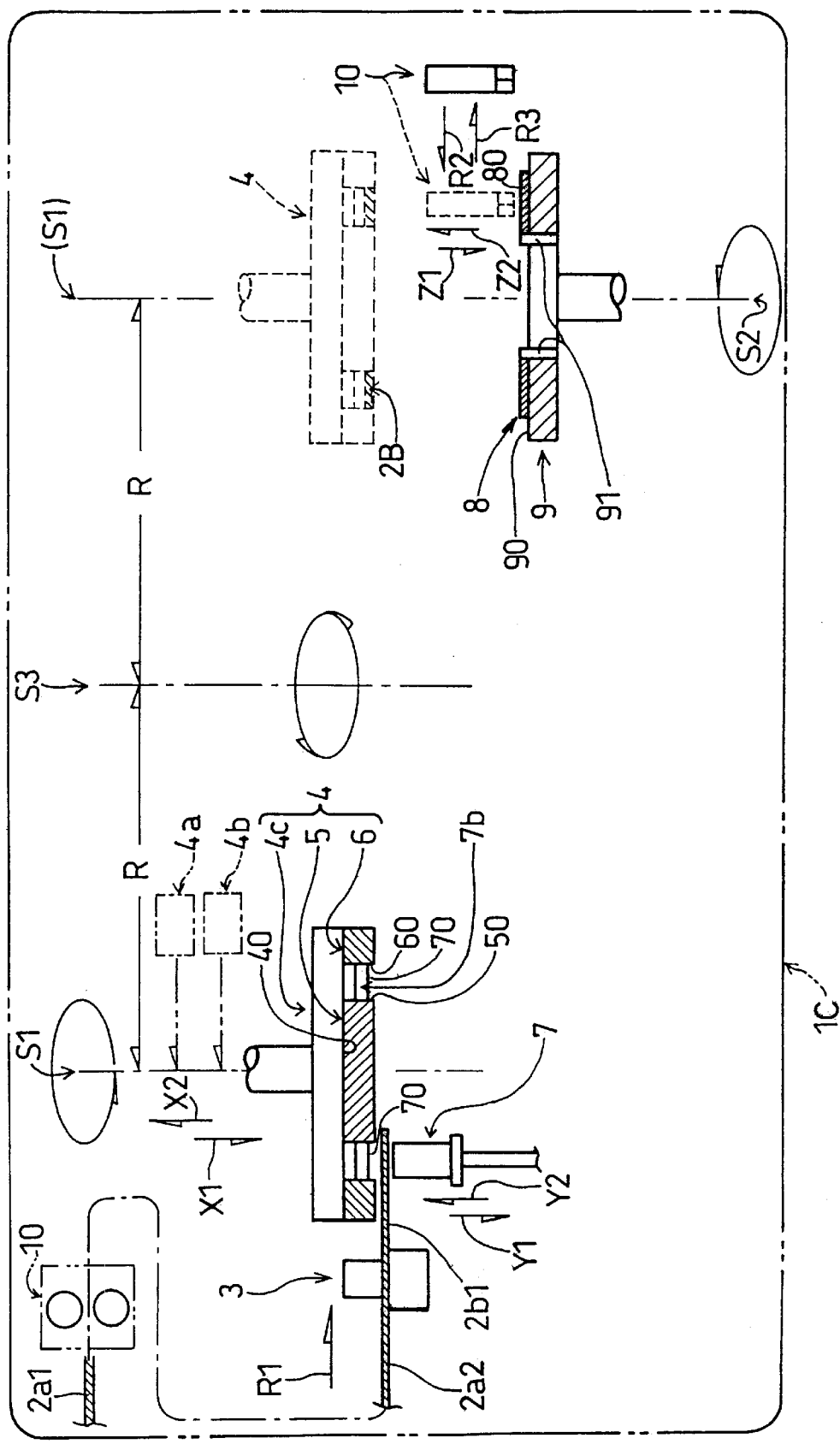
FIG. 18 is a front cross-sectional view of an embodiment 3 corresponding to a manufacturing method of friction plate for clutch and a manufacturing apparatus of friction plate for clutch.

Corresponding to it, a manufacturing apparatus 1C of the third embodiment has, as shown in FIG. 18, a thickness regulating device 10 is added to the trimming device 3, the holding body 4 having the pushing-out member 7b, the segment punch 7 cooperating with the holding body 4, the turn table 9 and the coating member 10 of the embodiment 1. The thickness regulating device 10 forms thickness of a friction blank material tape 2a1 into a thickness regulated friction material tape 2a2 by regulating (decreasing) thickness thereof.

(Thickness Regulating Step and Thickness Regulating Device)

Figure 19:
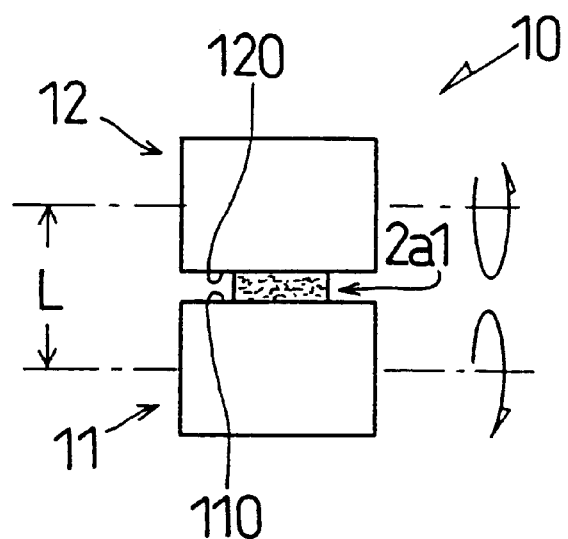
FIG. 19 is a front view showing a roller device used in the embodiment 3.
Figure 20:
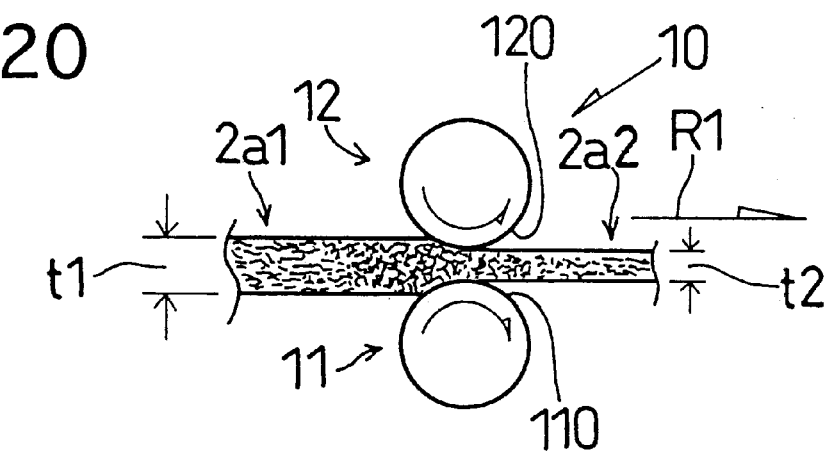
FIG. 20 is a side view of the roller device shown in FIG. 19.

The thickness regulating step uses a heat roller device 10 shown in FIGS. 19 and 20. This heat roller 10 is comprised of a circular pillar-shaped lower roller 11 and a circular pillar-shaped upper roller 12 opposing therewith. Each of the rollers 11 and 12 has axial length larger than with of the friction material tape 2a1 and is provided with a heat generator (not shown). The both rollers 11 and 12 are arranged so that rotating centers thereof are spaced by distance L which can be adjusted. Here, the paired rollers 11 and 12 can be disposed in a high temperature environment, instead of being provided with the heat generator therein. Also, one of the paired rollers 11 and 12 can be provided with the heat generator, while the other of them can be set in the high temperature environment.

The friction blank material tape 2a1 supplied to the heat roller device 10 is inserted between an outer peripheral surface 110 of the lower roller 11 and an outer peripheral surface 120 of the upper roller 12. Distance t2 (0.3 to 1.0 mm) between the outer peripheral surfaces 110 and 120 determined by adjusting distance L between the both centers is smaller than thickness t1 (0.5 to 1.6 mm) of the friction blank material tape 2a1. So, the friction blank material tape 2a1 is decreased thickness thereof from t1 to t2 under pressure and heat. Thus, the thickness regulated friction material tape 2a2 has been formed.

(Trimming Steps of Friction Material Tape)

The thickness regulated friction material tape 2a2 is formed into the trimmed friction material tape 2b1 by being trimmed the edges thereof by the trimming device 3 to have width narrowing configuration. Instead of the trimming device 3, the cutting roller 40 and the mating roller 41 of the above deformed sample 8 shown in FIGS. 14 and 15 can be used.

(Punching and Containing Step of Friction Material Segment)

Figure 21:
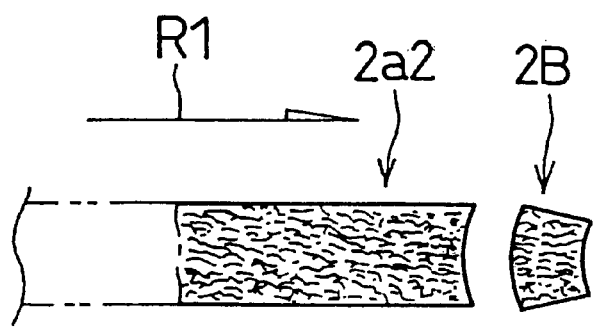
FIG. 21 is a plan view showing condition where a thickness regulated friction material tape is punched into a friction material segment.

The trimmed friction material segment 2b1 is conveyed in the R1 direction toward the holding body 4 until the tip end thereof reaches to position corresponding to the containing groove 70. Then, as shown in FIG. 21, the friction material tape 2b1 is punched into the friction material segment 2B by cooperation of the inner die 5, the outer die 6 and the segment punch 7. The friction material segment 2B is pushed into the containing groove 70 by the segment punch 7.

The friction material tape 2a2, having been heated and compressed in advance in the thickness regulating step, generates smaller amount of fiber-shape or particle-shape cutted chips, when it is punched into the friction material segment 2B and is pushed into the containing groove 70.

Here, instead of the above segment punch 7, the ring-shaped segment punch 7A of the deformed sample 1 shown in FIG. 6, or the circular-plate-shaped segment punch 7B of the deformed sample shown in FIG. 11 can be used. Also, instead of the above holding body 4, the holding body 4 including the circular-plate-shaped holding portion 5A and the outer die 6 of the deformed sample 5 shown in FIG. 11 can be used.

(Adhering Step of Friction Material Segment)

Figure 5:
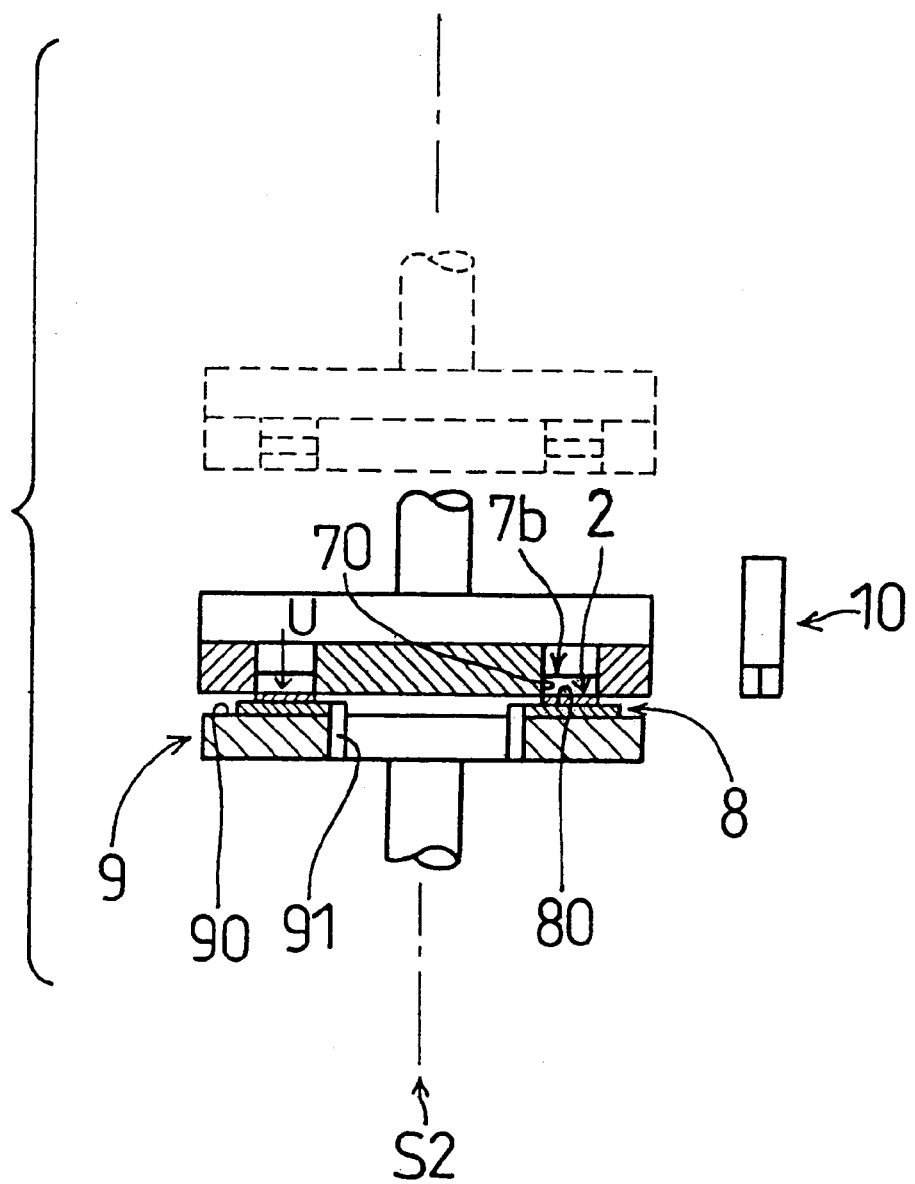
FIG. 5 is a front cross-sectional view showing, in the embodiment 1, condition for making the holding body having contained the friction material segments to come near to the core plate.

The friction material segments 2B of the embodiment 3 are attached to the core plate 8 in the same manner as the friction material segments 2 of the embodiment 1 shown in FIGS. 1, 4 and 5. That is, as shown in FIG. 18, the holding body 4 having held the plural friction material segments 2B in the containing groove 70 moves from the punching position to the adhering position via the revolution about the axis S3 and the succeeding decrease along the axis S1. Then, all of the friction material segments 2 in the holding body 4 are pushed out by the pushing-out member 7b simultaneously and are adhered to the core plate 8 mounted on the turn table 9.

Adhering the friction material segment 2B to the core plate 8 in the embodiment 3 renders the advantage of no post treatment for thickness regulation being required, in addition to the advantages rendered by the embodiment 1. That is, the friction material segment 2a2 having been regulated thickness thereof under heat and pressure in the thickness regulating process, only requires the hardening treatment of the adhesive agent by the hot press after adhered to the adhering surface 80 of the core plate 8.

Here, the holding body 4 can be moved from the punching position to the adhering position via the linear movement in the horizontal direction and the succeeding descending as moved in the embodiment 2.

<Deformed sample 10>

Figure 22:
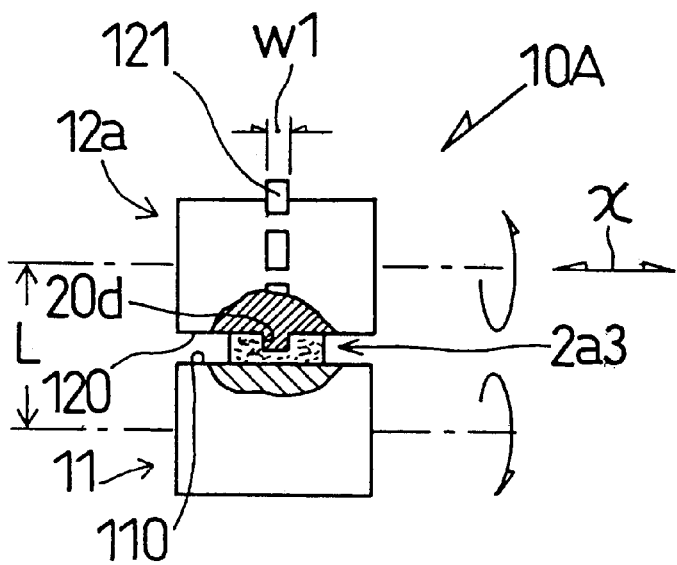
FIG. 22 is a front view showing another roller device used in the embodiment 3.
Figure 23:
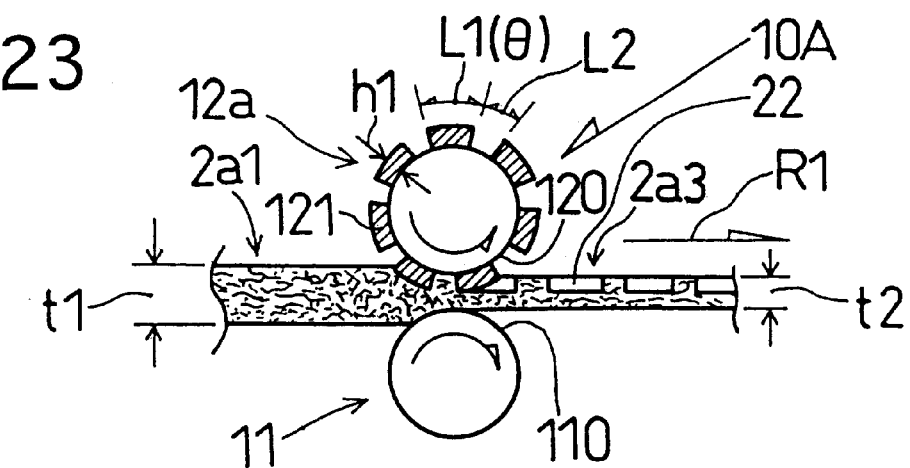
FIG. 23 is a side view of the roller device shown in FIG. 22.

In a deformed sample 10 of the thickness regulating step, it uses a heat roller device 10A shown in FIGS. 22 and 23. This heat roller 10A is comprised of a circular pillar-shaped lower roller 11, and a convexed upper roller 12a opposing therewith. Each of the rollers 11 and 12a has axial length larger than width of the friction material tape 2a1 and is provided therein with a heat generator (not shown). The both rollers 11 and 12a are arranged so that rotating centers thereof are spaced by distance L which can be adjusted. The convexed roller 12a at a central portion in an axial direction x thereof, has plural protrusions 121 protruded radially outwardly and disposed equidistantly in a circumferential direction. Each protrusion 121 has height h1 of about 0.2 mm from the outer peripheral surface 120, width 1 of about 1 to 2 mm, and circumferential length L1 (corresponding to angle θ) of about 10 to 20 mm. Interval L2 between the adjacent protrusions 121 is about 5 to 10 mm.

Here, each dimension of the protrusion 121 can be selectively determined. The paired rollers 11 and 12a can be disposed in a high temperature environment, instead of being provided with the heat generator therein. Also, one of the paired rollers 11 and 12a can be provided with the heat generator, while the other of them can be set in the high temperature environment.

The friction blank material tape 2a1 supplied to the heat roller device 10A is inserted between an outer peripheral surface 110 of the roller 11 and an outer peripheral surface 120 of the roller 12a as shown in FIGS. 22 and 23. The friction blank material tape 2a1 is decreased thickness thereof from t1 (0.5 to 1.6 mm) to t2 (0.3 to 1.0 mm) under pressure and heat. Thus, the thickness regulated friction material tape 2a3 has been formed. Simultaneous with it, a plural rectangular cavities 22 are formed on the friction material tape 2a3 equidistantly in the longitudinal direction at an central portion in the widthwise direction nipped by the peripheral surface 110 of the circular pillar-shaped roller 11 and the protrusions 121 of the convexed roller 12a, due to higher pressure at the central portion than the both side portions.

Figure 24:
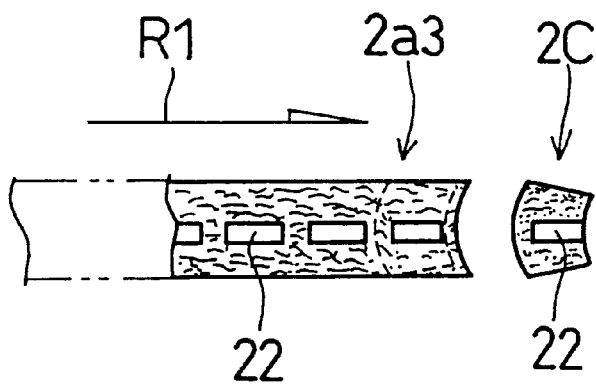
FIG. 24 is a plan view showing condition where a thickness regulated friction material tape formed by the heat roller of FIGS. 2 1 and 22 is punched into a friction material segment.

The friction material tape 2a3 is cutted at a portion positioned between the adjacent cavities 22 by the cutting unit including the inner die 5, the outer die 6 and the segment punch 7 (refer to Fit. 3) to form a friction material segment 2C shown in FIG. 24. The plural cavities 22, when the friction material segments 2C are adhered to the core plate 8, function as oil holding portion for holding lubricant oil therein.

<Deformed sample 11>

Figure 25:
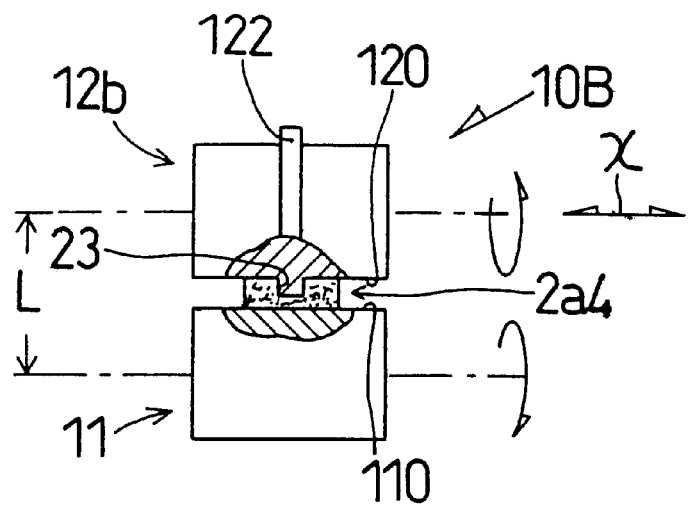
FIG. 25 is a front view showing still another roller device used in the embodiment 3.
Figure 26:
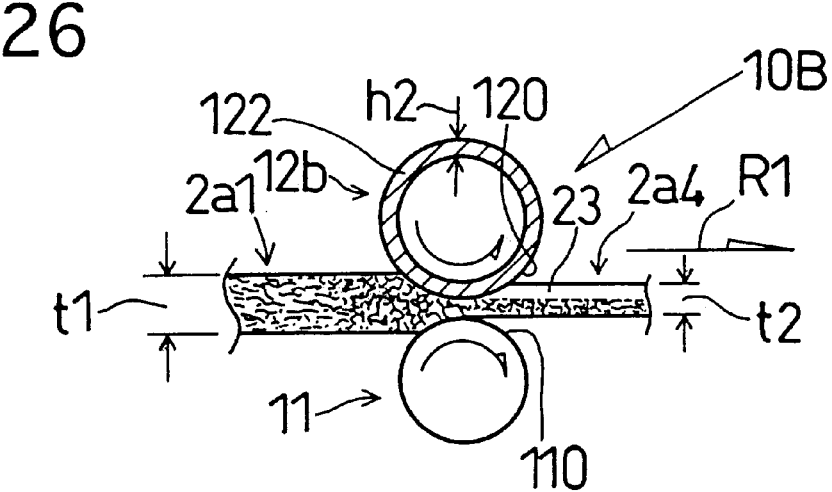
FIG. 26 is a side view of the roller device shown in FIG. 25.

In a deformed sample 11 of the thickness regulating step, it uses heat roller device 10B shown in FIGS. 25 and 26. This heat roller 10B is comprised of a circular pillar-shaped lower roller 11 and a convexed upper roller 12b opposing therewith. Each of the rollers 11 and 12b has axial length larger than width of the friction material tape 2a1 and is provided therein with a heat generator (not shown). The both rollers 11 and 12b are arranged so that rotating centers thereof are spaced by distance L which can be adjusted.

The convexes roller 12b at a central portion in an axial direction x thereof, has a ring-shaped protrusions 122 protruded radially outwardly. The ring-shaped protrusion 122 has height h1 of about 0.2 mm from the outer peripheral surface 120, and width w1 of about 1 to 2 mm. Here, the paired rollers 11 and 12b can be disposed in a high temperature environment, instead of being provided with the heat generator therein. Also, one of the paired rollers 11 and 12b can be provided with the heat generator, while the other of them can be set in the high temperature environment.

The friction blank material tape 2a1 supplied to the heat roller device 10B is inserted between an outer peripheral surface 11 0 of the roller 11 and an outer peripheral surface 120 of the roller 12b as shown in FIGS. 25 and 26. The friction blank material tape 2a1 is decreased thickness thereof from t1 (0.5 to 1.6 mm) to t2 (0.3 to 1.0 mm) under pressure and heat. Thus, the thickness regulated friction material tape 2a4 has been formed. Simultaneous with it, the longitudinally extended groove 23 is formed on the friction material tape 2a4 at an central portion in the widthwise direction nipped by the peripheral surface 110 of the circular pillar-shaped roller 11 and the protrusions 122 of the convexed roller 12b, due to higher pressure at the central portion than the both side portions.

The friction material tape 2a4 is cutted at plural portions by the cutting unit including the inner die 5, the outer die 6 and the segment punch 7 (refer to FIG. 3) to form a friction material segment 2D shown in FIG. 24. The extended groove 23, when the friction material segments 2D are adhered to the core plate 8, function as oil holding portion for holding lubricant oil therein.

Figure 27:
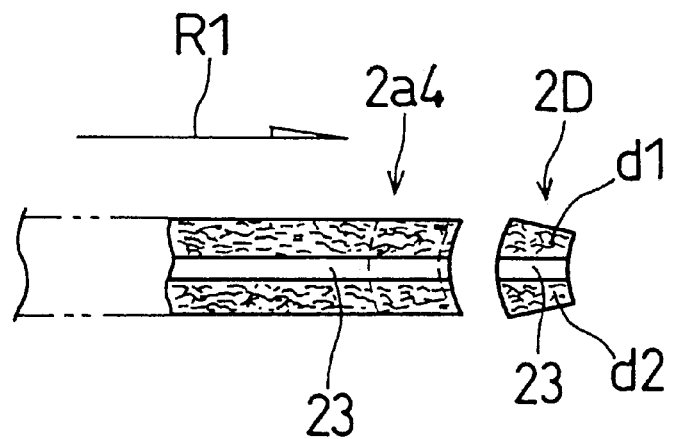
FIG. 27 is a plan view showing condition where a thickness regulated friction material tape formed by the heat roller of FIGS. 2 5 and 26 is punched into a friction material segment.

In addition, as shown in FIG. 27, the friction material segment 2D has two segment portions d1 and d2 at both sides of the groove 23. With selecting width of the friction material tape 2a4 corresponding to the circumferential length of the holding body 4 about twice of the normal friction material tape 2b, the single friction material segment 2D can form two segment portions d1 and d2 each corresponding to the normal friction material segment 2. Such friction material segment 2D shortens the time periods necessary for punching the friction material tape 2a4 into the friction material segment 2D and for containing the friction material segment 2D into the containing groove 70 to half of that in the normal friction arterial segment 2, respectively.

<Embodiment 4>

Figure 28:
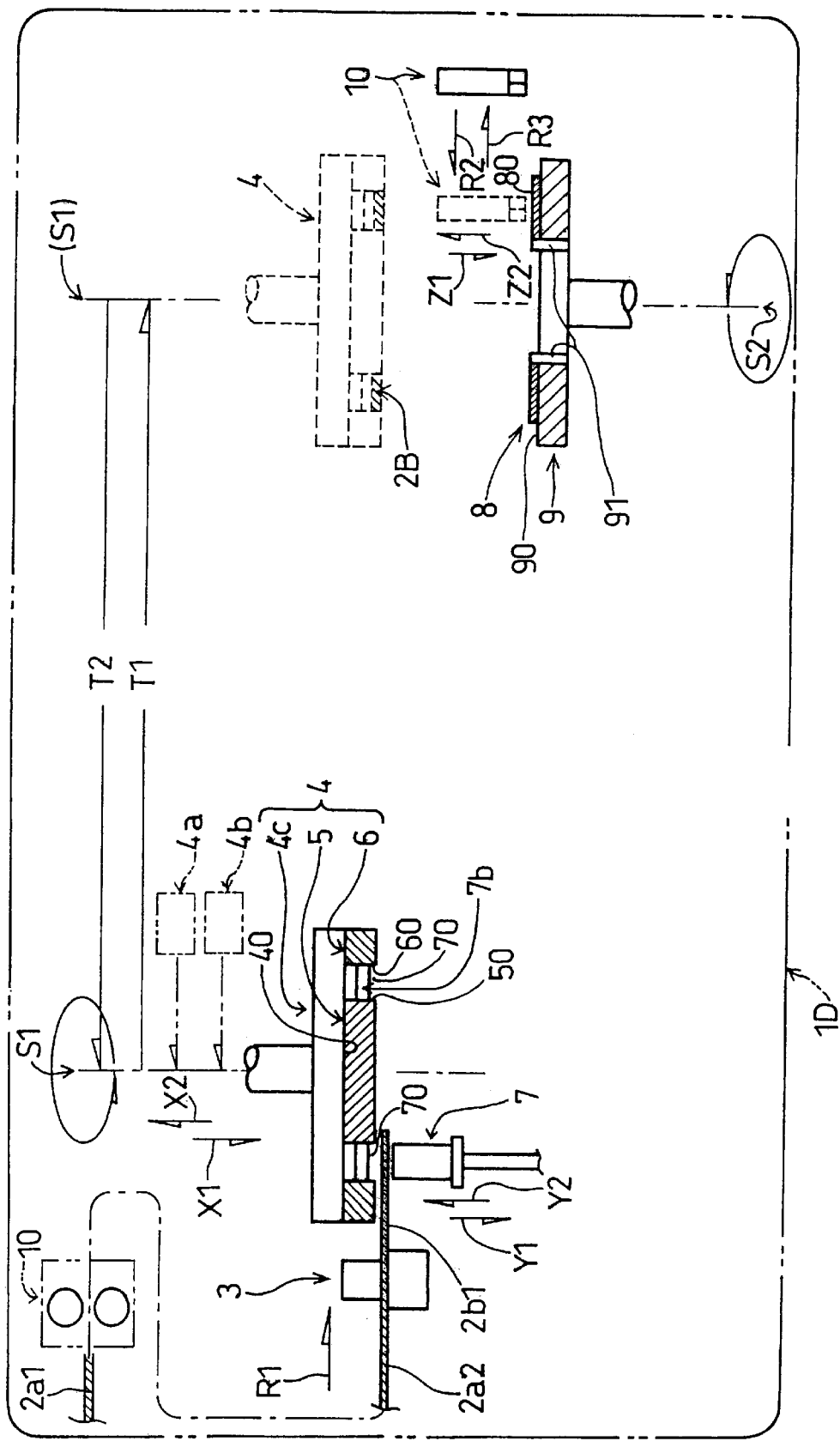
FIG. 28 is a front cross-sectional view of an embodiment 4 corresponding to a manufacturing method of friction plate for clutch and a manufacturing apparatus of friction plate for clutch.

An embodiment 4 corresponding to a manufacturing method for a friction plate for clutch, and a manufacturing apparatus 1D of a friction plate for clutch for carrying out the manufacturing method, will be explained based on FIG. 28. This embodiment 4 differs the former half of the adhering step and corresponding construction from that of the above embodiment 3.

In detail, the holding body 4 holding the plural friction material segments 2B (refer to FIG. 21) formed by punching the thickness regulated friction material tape 2a2 (refer to FIG. 20) is located at the punching position. It moves from the punching position to the upper position in the T1 direction by a driving portion (not shown), and then lowered by the convey controlling portion 4b. All of the held friction material segments 2B are pushed out simultaneously by the pushing-out member 7b to be adhered to the core plate 8. The holding body 4 having pushed out the friction material segments 2B is lifted up to the upper position and moves in the T2 direction to return to the punching position. Thus, the embodiment 4 corresponds to deformed sample in which the thickness regulating process is added to the above embodiment 2 before the trimming step.

Adhering the friction material segment 2D to the core plate 8 in the embodiment 4 renders the advantage of no post treatment for thickness regulation being required, in addition to the advantages rendered by the embodiment 2. That is, the friction material segment 2a2, having been regulated thickness thereof under heat and pressure in the thickness regulating process, only requires the hardening treatment of the adhesive agent by the hot press after adhered to the adhering surface 80 of the core plate 8.

In the embodiment 4, instead of the friction material segment 2B, the friction material segment 2C shown in FIG. 24, or the friction material segment 20 shown in FIG. 27 can be used.

What is claimed is:

1. A method of manufacturing a friction plate for a clutch comprising the steps of:

cutting a band shaped friction material into segments;

applying one of the friction material segments onto a circumferential surface portion of a holding body;

rotating said holding body having the one of the friction material segments applied thereto;

applying another of the friction material segments onto another circumferential surface portion of the rotated holding body; and adhering the friction material segments held by said holding body to an adhesive adhering surface of a core plate by causing said holding body and said core plate to approach one another.

2. The method of claim 1, wherein each of said applying steps comprises urging one of said friction material segments along the respective circumferential surface portion in a radial direction of the holding body.

3. The method of claim 1, wherein said holding body has a plurality of absorbing holes, and wherein each of said applying steps comprises urging one of said friction material segments onto a respective circumferential surface by a low pressure absorbing force using said absorbing holes.

4. The method of claim 1, further comprising at least one urging portion held by said holding body and shiftable relative thereto, wherein said adhering step comprises driving the at least one urging portion to urge a friction material segment onto an adhesive adhering surface.

5. The method of claim 1, wherein each of said applying steps comprises simultaneously applying two of said friction material segments.

6. The method of claim 4, wherein each of said applying steps comprises simultaneously driving plural urging portions to urge plural ones of said friction material segments.

* * * * *